July 22, 1941.    P. J. LINDNER    2,249,964
ELECTRICALLY CONTROLLED HYDRAULIC TURRET PRESS
Filed Aug. 16, 1938    10 Sheets-Sheet 1
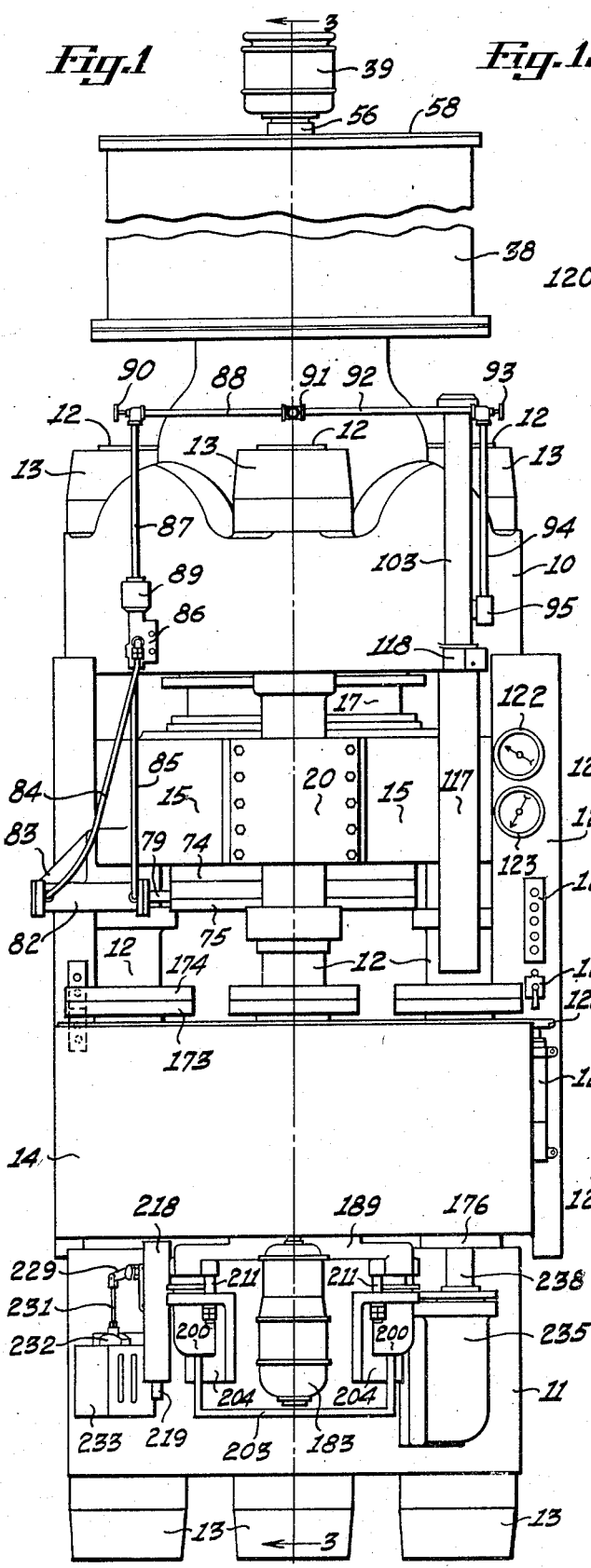
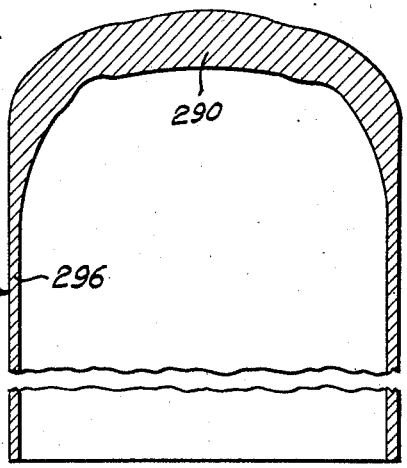
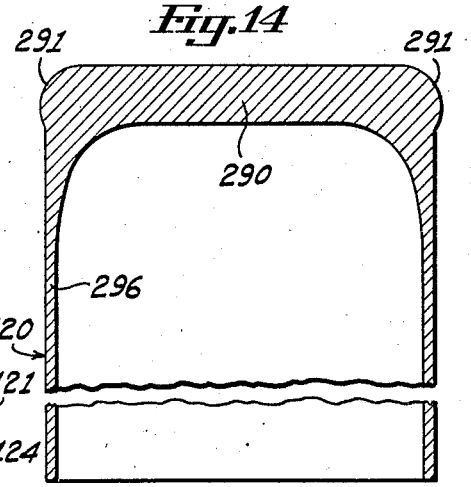
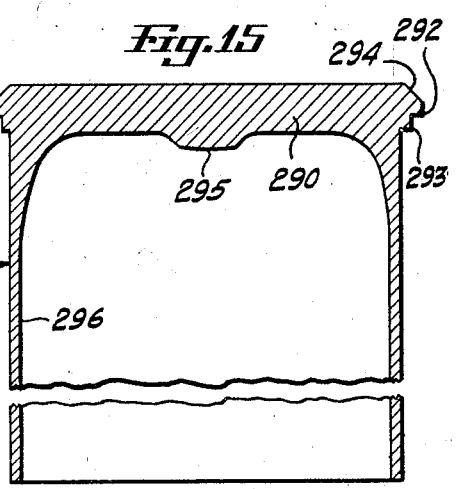
Inventor
PHILIP J. LINDNER
By
Toulmin & Toulmin
Attorneys

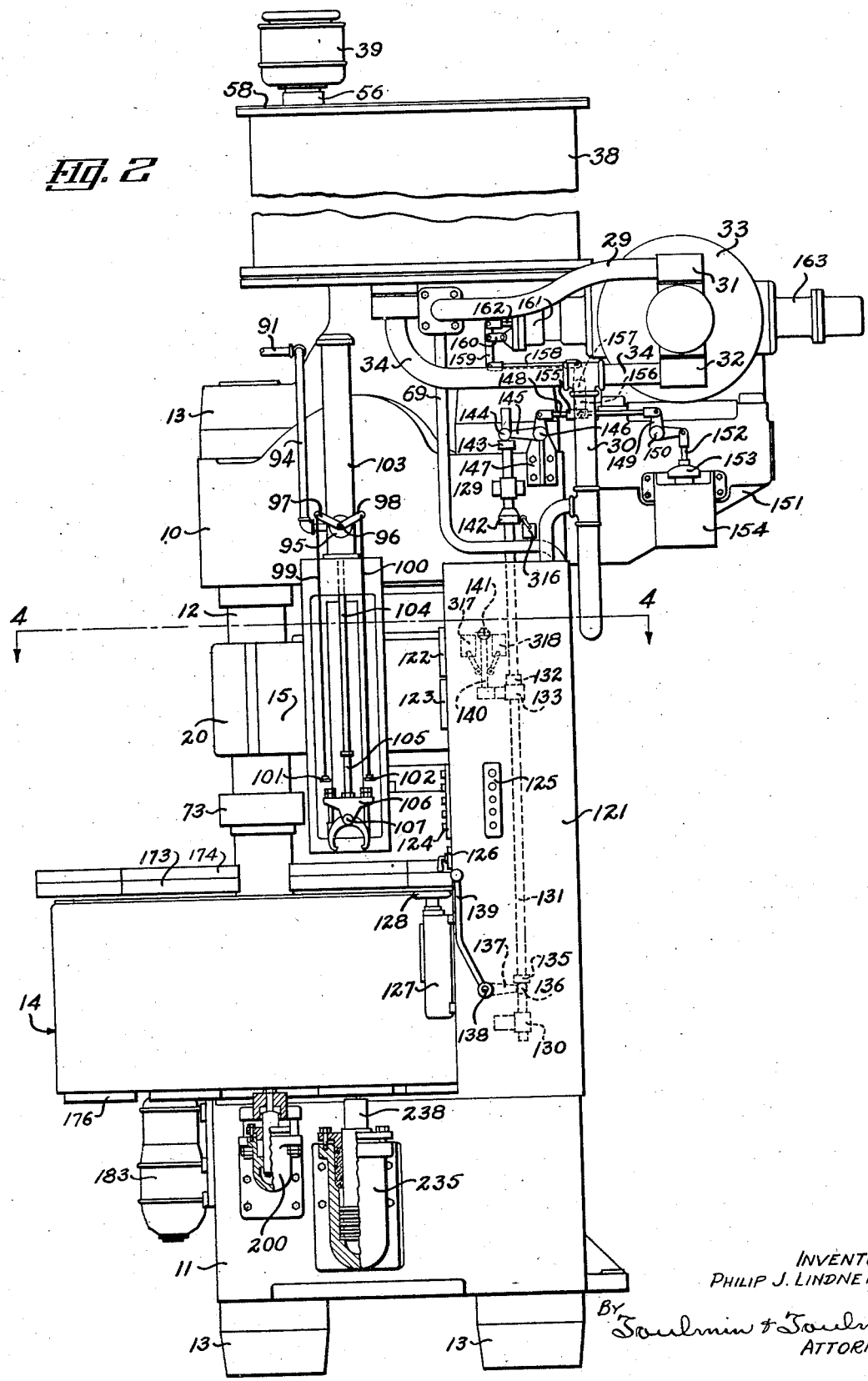

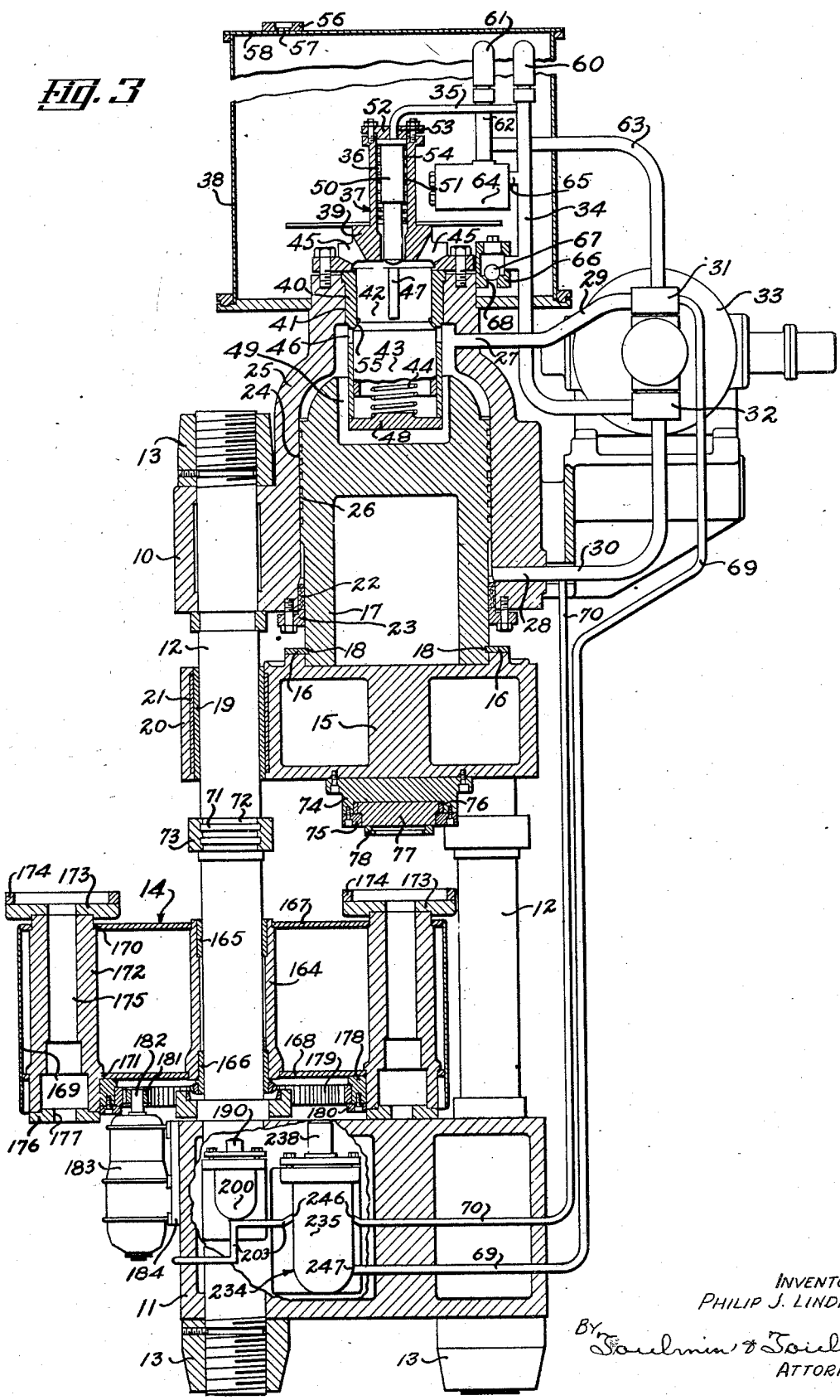

July 22, 1941. P. J. LINDNER 2,249,964
ELECTRICALLY CONTROLLED HYDRAULIC TURRET PRESS
Filed Aug. 16, 1938 10 Sheets-Sheet 4

INVENTOR
PHILIP J. LINDNER
BY
Toulmin & Toulmin
ATTORNEYS

July 22, 1941.  P. J. LINDNER  2,249,964
ELECTRICALLY CONTROLLED HYDRAULIC TURRET PRESS
Filed Aug. 16, 1938  10 Sheets-Sheet 5
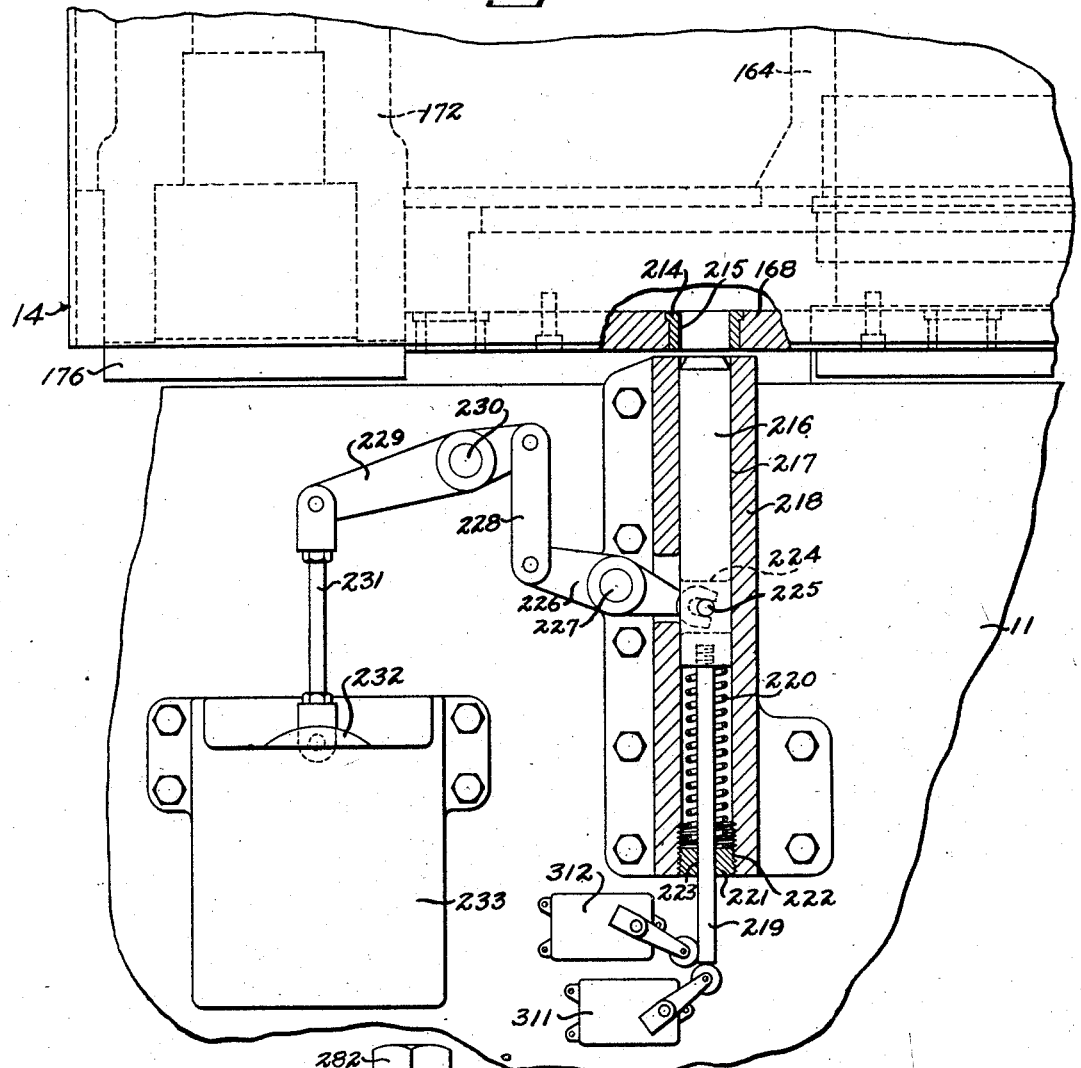
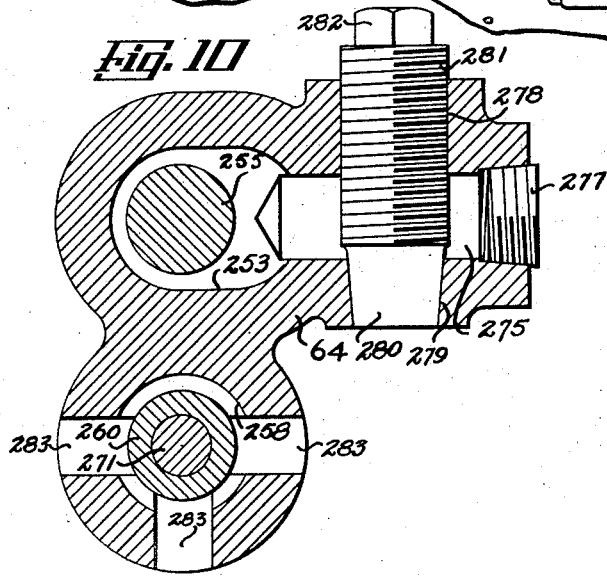
INVENTOR
PHILIP J. LINDNER
BY
Toulmin & Toulmin
ATTORNEYS

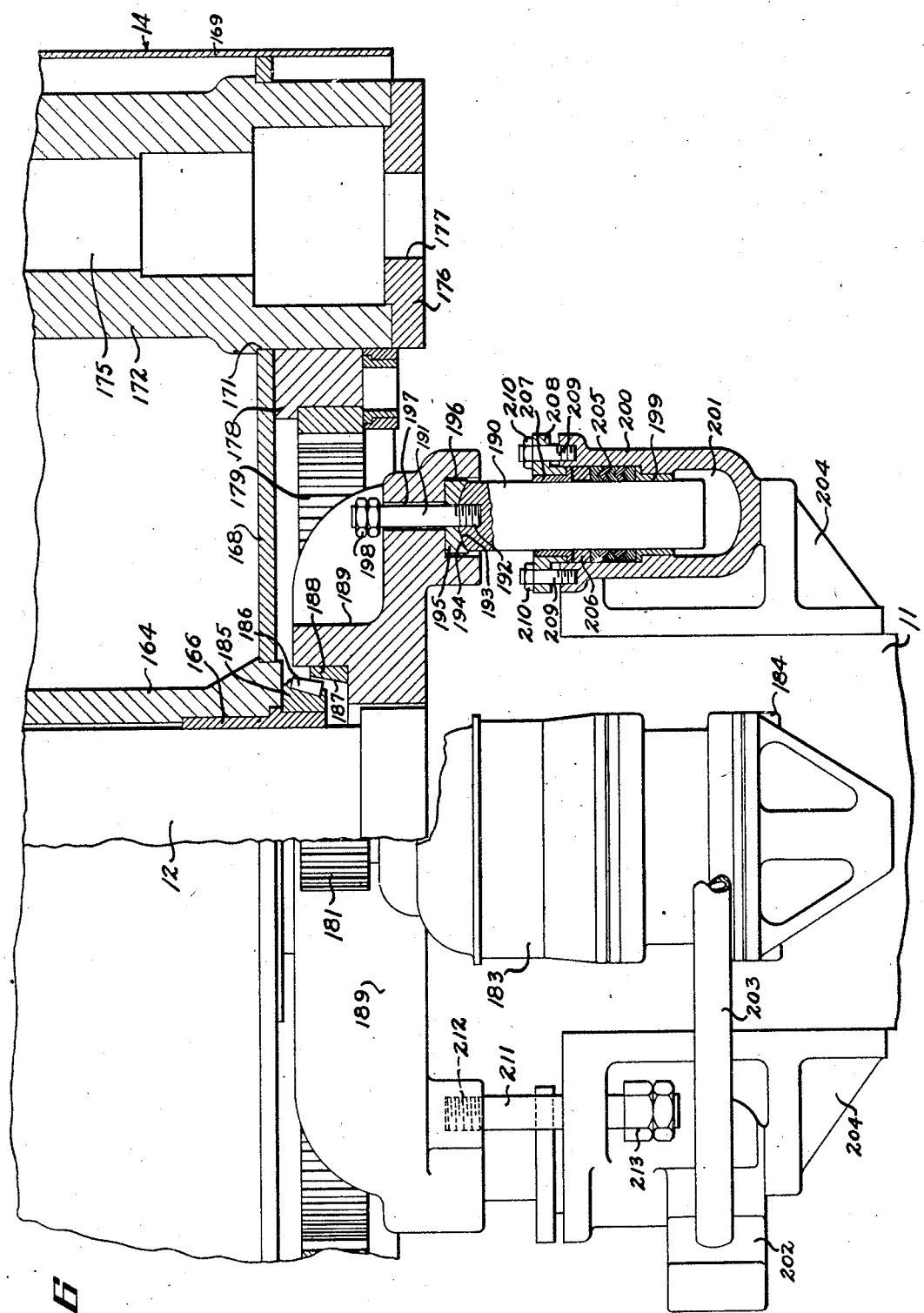

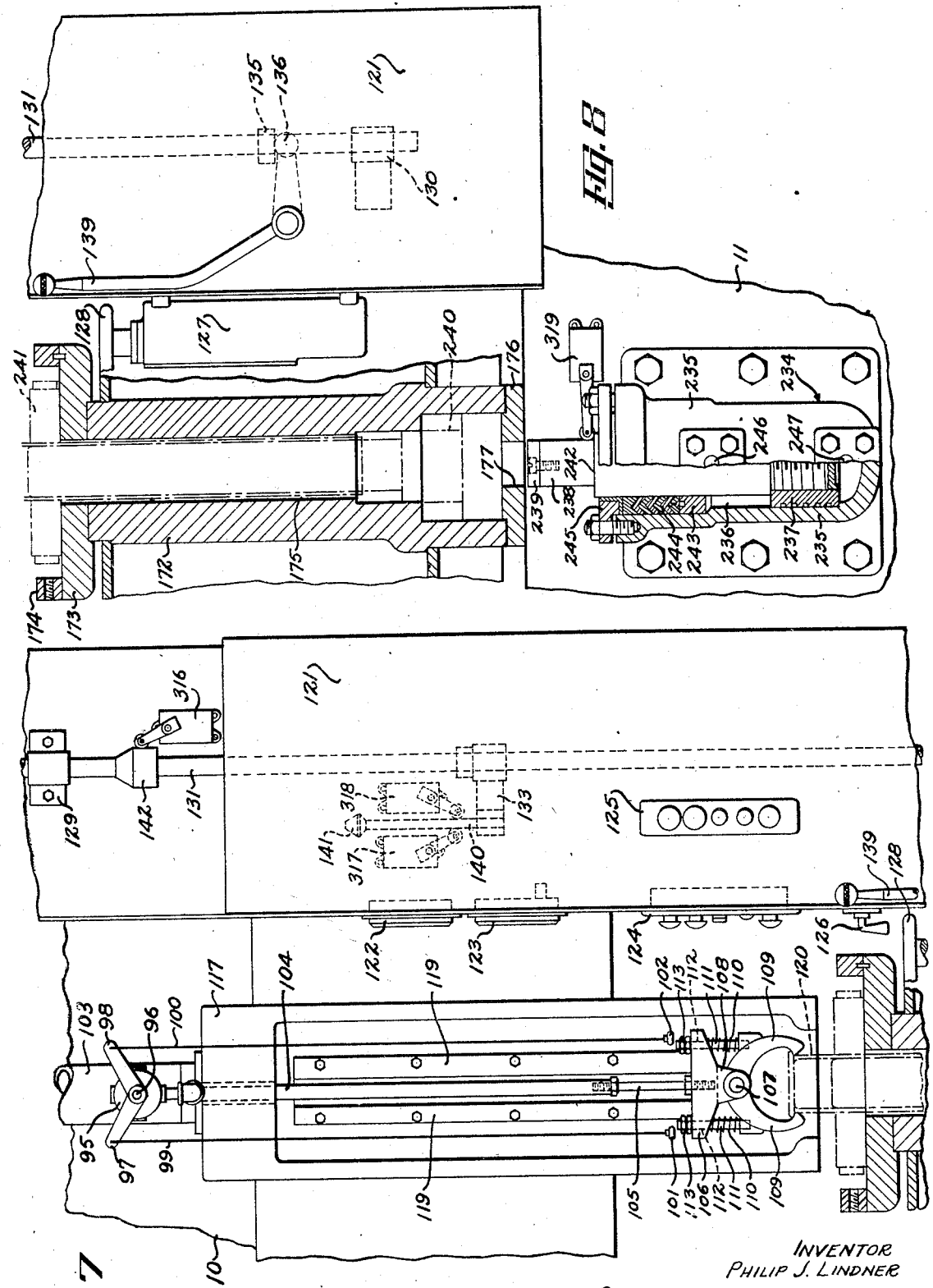

Inventor
PHILIP J. LINDNER
By Toulmin & Toulmin
Attorneys

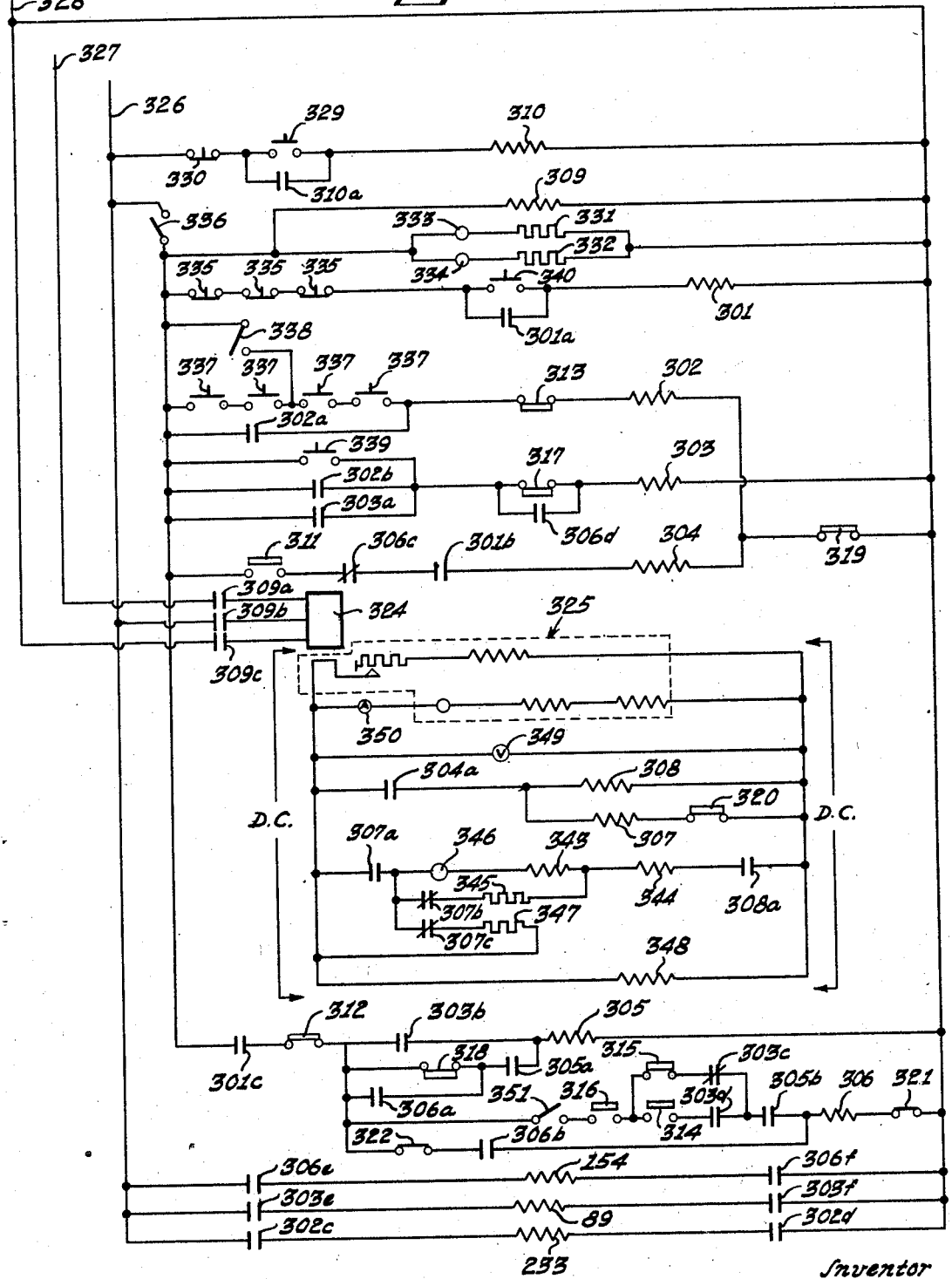

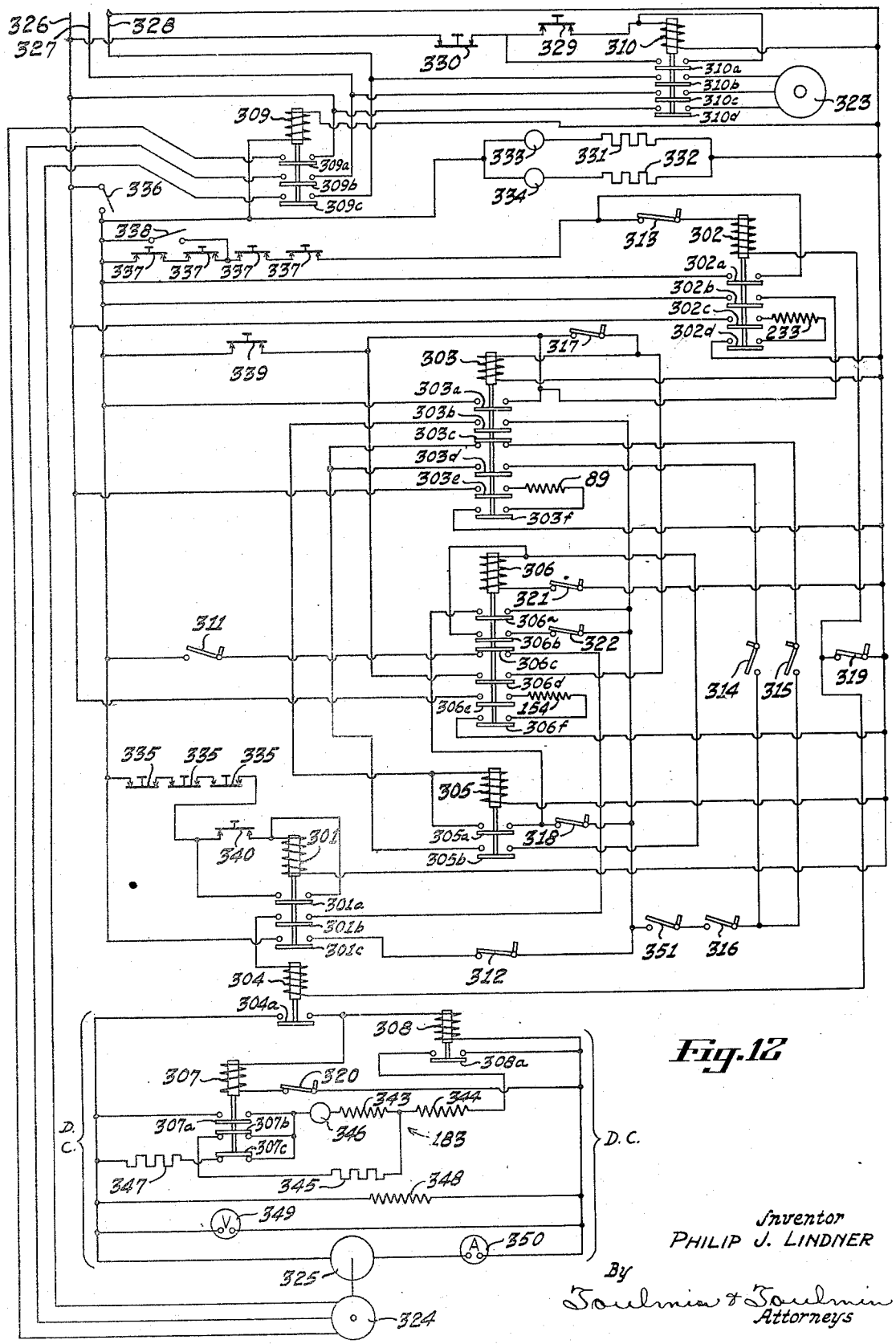

Patented July 22, 1941

2,249,964

UNITED STATES PATENT OFFICE 2,249,964

ELECTRICALLY CONTROLLED HYDRAULIC TURRET PRESS

Philip J. Lindner, Mount Gilead, Ohio, assignor to The Hydraulic Development Corp. Inc., Wilmington, Del., a corporation of Delaware Application August 16, 1938, Serial No. 225,250

27 Claims. (Cl. 78—42)

This invention relates to presses and press control systems, and in particular, to turret presses having rotary turrets for feeding the workpieces to the press.

One object of this invention is to provide a turret press having means for removing the load of the turret from its bearings during the pressing operation, and utilizing the bearings only during the rotating or indexing operations.

Another object is to provide a turret press, wherein the turret is arranged to be supported upon the bed of the press out of engagement with its rotary bearings during the pressing operations, and having means for bringing the bearings into contact with the turret so as to free the turret from its engagement with the press bed during the rotating and indexing operations, thereby relieving the turret bearings and turret revolving mechanism of all strain during the pressing operations, and to effect the sustaining of this strain by the press bed itself.

Another object is to provide a turret press having means for automatically loosening or ejecting the workpiece from the die after the pressing operation, this means being synchronized for automatic operation at the conclusion of the pressing operations without the necessity for attention thereto upon the part of the operator.

Another object is to provide a turret press having means for alternately placing a plurality of separate dies in the working position at a given turret station, so as to perform two separate pressing operations in sequence upon the workpiece.

Another object is to provide a control system for a turret press, as described in the preceding paragraph, wherein the motion of the two dies is synchronized with the motion of the press ram so as to insure that the proper press die will be completely in position before the press ram is permitted to perform its pressing stroke.

Another object is to provide a turret press having mechanism cooperating with the workpiece loosening or ejecting means for hoisting the workpiece out of the turret after the loosening or ejecting has taken place.

Another object is to provide a turret press having means for effecting the various movements of the press elements in timed sequence automatically, without the necessity for attention thereto by the operator or for dependence upon his judgment, such movements, for example, including the rotation of the turret, the motion of the turret locking device, the motion of the turret bearing raising and lowering mechanism, the motion of the die carrier to its different positions and the operation of the pressing platen.

Another object is to provide an interrelated electrical control system for automatically controlling the movements of the turret press elements, as set forth in the preceding paragraph.

Another object is to provide an electrical control system for turret presses, wherein means is provided for preventing the occurrence of the movements of the various elements of the press in improper sequence or at undesired times or positions.

Another object is to provide an electrically actuated turret press, wherein the electrical turret driving motor is provided with an electrical control circuit for slowing down and dynamically braking the turret automatically as it approaches the working positions.

In the drawings:

Figure 1 is a front elevation of a turret press embodying the improvements of the present invention, looking toward the strain rod about which the turret revolves.

Figure 2 is a right-hand side elevation of the turret press shown in Figure 1, with one of the turret raising cylinders and the ejector cylinder shown partly in section.

Figure 3 is a transverse vertical section taken along the line 3—3 in Figure 1, except that for convenience of showing of the hydraulic circuit the pump ejector cylinder and one of the turret raising cylinders are shown in side elevation rather than in section.

Figure 5 is an enlarged front elevation, partly in section, showing the turret locking mechanism as shown in the lower portion of Figure 1.

Figure 6 is an enlarged detail view, partly in section, of the turret-lifting mechanism shown at the bottom of Figure 1, assuming that the turret has been revolved during the indexing movement to a point where the center line of a turret station coincides with a center line of one of the lifting cylinders before the turret station reaches the pressing position.

Figure 7 is an enlarged side elevation, partly in section, similar to the central portion of Figure 2 and showing the hoisting mechanism for hoisting a workpiece out of the turret after it has been loosened or partially ejected.

Figure 8 is an enlarged side elevation, mainly in section, showing the ejecting or workpiece-loosening mechanism located immediately below the hoisting mechanism of Figure 7, and in effect, forming a continuation of Figure 7.

Figure 10 is a cross section along the line 10—10 in Figure 9.

Figure 11 is an elementary wiring diagram showing the various electrical elements and connections in the electrical control circuit of the turret press of this invention.

Figure 12 is a wiring diagram showing the same circuit as in Figure 11, but with the various switchblades of each relay or contactor arranged adjacent one another to show their operation more clearly.

Figure 13 is a diagrammatic cross section through a typical workpiece, ready for the first pressing operation in the turret press of this invention.

Figure 14 is a view similar to Figure 13, but showing the workpiece after the completion of the first pressing operation and ready for the second pressing operation.

Figure 15 is a view similar to Figures 13 and 14, but showing the workpiece after the completion of the second pressing operation and ready to be ejected from the press.

General arrangement

Figure 4:
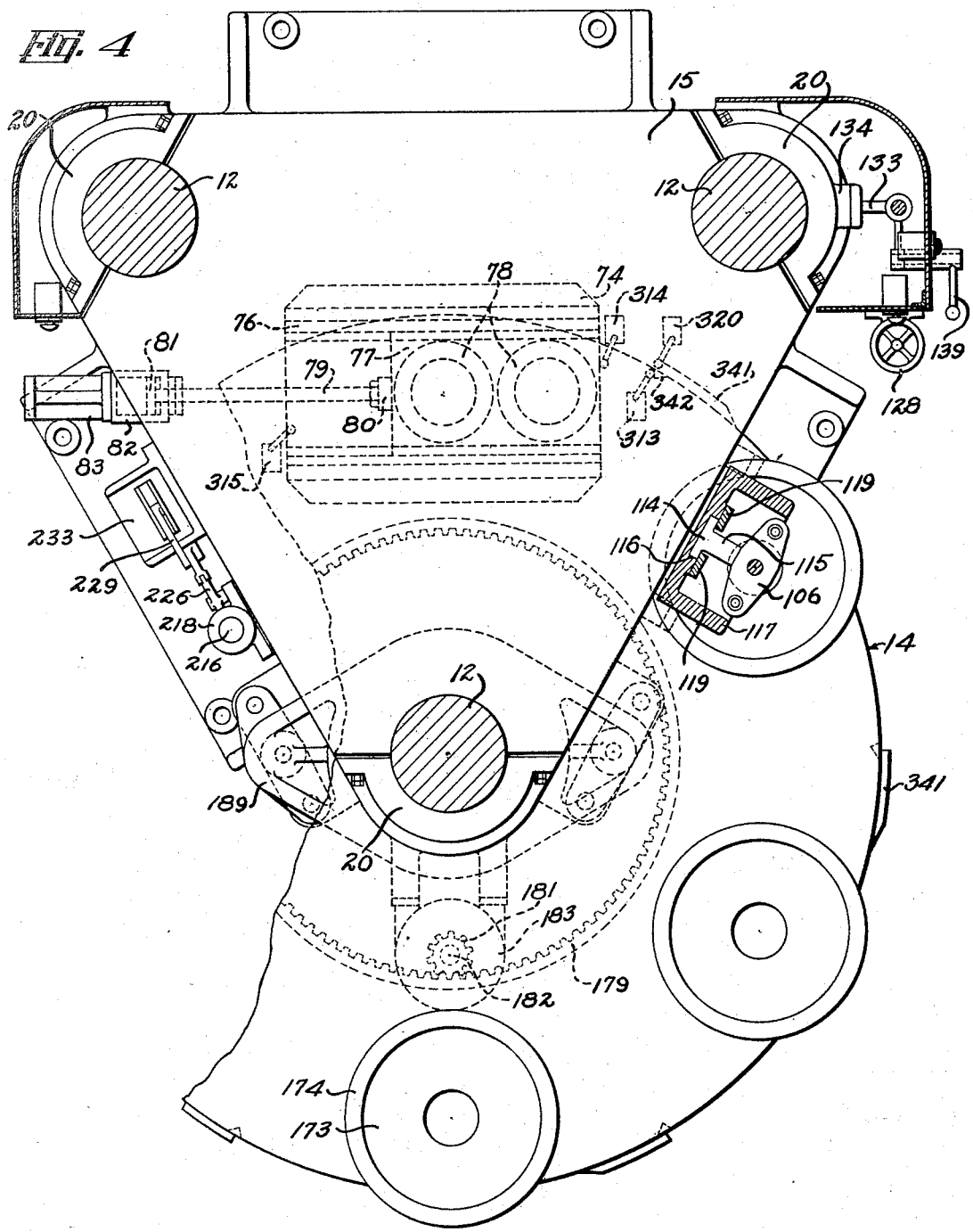
Figure 4 is a horizontal section through the press, taken along the line 4—4 in Figure 2, with portions of the turret broken away to disclose the mechanism thereunder more clearly.

In general, the turret press of this invention consists of a press frame having a bed and a head interconnected by strain rods, the arrangement of three strain rods being preferable because it enables one of the strain rods to be used as the fixed shaft about which the turret is rotated. The turret is normally supported upon the bed of the press during the pressing operations, but is raised from the press bed and into engagement with anti-friction bearings during its rotating or indexing operations. After the indexing operations are completed, the turret is brought to rest upon the press bed, thereby removing the load from the turret bearings so that the press bed and not the turret bearings sustains the thrust of the pressing platen during the pressing operations. A movable die carrier is provided for alternately placing two separate upper dies in the working position at a given turret station so as to perform two separate pressing operations in sequence upon the workpiece.

A hydraulic motor is provided for raising and lowering the turret relatively to the press bed and the turret supporting bearings. A spring controlled by an electromagnetic device is provided for operating the turret locking member by which the turret is locked in position after being indexed to its working position at a given station, and during the pressing operation. A second hydraulic motor is provided for loosening or ejecting the workpiece from the turret, and a fluid pressure motor cooperates therewith for hoisting the thus loosened workpiece out of the turret. Still another fluid pressure motor is provided for shifting the die carrier to and fro, so as to present its dies sequentially in their working positions. A direct current motor is provided, together with an appropriate electrical circuit, for rotating the turret during its indexing operations, and for dynamically slowing down and braking the turret as it approaches a given indexing position. A main hydraulic motor, consisting of a main cylinder and plunger, is provided for performing the pressing operations upon the workpieces, and a suitable hydraulic circuit is provided for supplying pressure fluid to the various motors. An electrical circuit is likewise provided and interrelated with the hydraulic circuit for causing the various operations of the press to take place automatically and in the proper sequence. Certain electrical devices, such as interconnected contactors or relays, are provided for preventing the motion of the various elements except at their proper times and to their proper positions, thereby relieving the operator of the necessity of devoting his attention or judgment thereto.

Mechanical construction

Referring to the drawings in detail, Figure 1 shows one embodiment of the turret press of this invention as including a press head 10 and a press bed 11, interconnected by strain rods 12 with nuts 13 threaded upon the ends thereof. The strain rods 12 are three in number, the central one having a turret assembly, generally designated 14, rotatably supported thereon, as hereinafter described in detail. Reciprocably mounted upon the strain rods 12 is a platen 15, connected by the split ring 16 (Figure 3) to the main plunger 17 at the groove 18 therein. The platen 15 is guided upon the strain rods 12 by means of the precision bored split bushings 19, held in place by the caps 20 bolted to the platen 15. The space between the caps 20 and the split bushings 19 is filled by an annular ring of Babbitt metal 21, which is cast around the split bushings 19 after the caps 20 are bolted in position. By this arrangement the split bushings 19 are properly located with respect to the remainder of the press, and no cramping action therefore occurs.

Surrounding the main plunger 17 is a packing 22 arranged to be compressed by a gland 23, bolted to the head 10 of the press. The main plunger 17 is illustrated as being double-acting in that it is reciprocable within a cylinder bore 24 formed in the main cylinder portion 25 of the press head 10, and has a piston head 26 with arrangements for admitting pressure fluid on the opposite sides thereof. The main cylinder 25 is provided for this purpose with upper and lower ports 27 and 28, from which the conduits 29 and 30 lead respectively to the forward and return connections 31 and 32 of the reversible variable delivery pump 33. The piping shown in Figure 3 is rearranged slightly from that shown in Figure 2 in order to show the entire course thereof and to disclose portions of the piping which are concealed by portions of the press in Figure 2.

Communicating with the conduit 30 and return connection 32 is a conduit 34, having a branch 35 connected to the operating cylinder 36 of the surge valve, generally designated 37. The latter is mounted within the surge tank 38 on top of the press head 10, and is of the type disclosed in the Ernst Patent No. 1,892,568, issued Dec. 27, 1932. The surge valve 37 consists of a casing 39 (Figure 3) bolted to the main cylinder 25, and having a sleeve 40 disposed in a port 41 interconnecting the top of the main cylinder bore 24 and the interior of the surge tank 38. Reciprocable within the sleeve 40 is a surge valve plunger 42 having an enlarged portion 43, urged upwardly into a closing position by means of the coil spring 44. The coil spring 44, however, exerts a very light tension, merely sufficient to overcome the forces of gravity, and enabling the valve plunger 42 to be drawn downwardly in response to suction in the top of the main cylinder bore 24, and to draw fluid through the ports 45 and 46 and through the interior of the sleeve 40. The valve plunger 42 is provided with flutes 47 to permit the passage of the fluid thereby. The bottom of the sleeve 40 is closed by a disc 48, serving also as an abutment for the lower end of the coil spring 44. The disc 48 and the lower end of the sleeve 40 rest within a recess 49 in the upper end of the main plunger 17 when the latter is in its upper or retracted position.

In order to hold open the valve plunger 42 during the return stroke of the main plunger 17, the surge valve casing 39 is provided with an auxiliary plunger 50 reciprocable within a bore 51, closed by the cylinder head 52 and having a port 53 for the connection of the conduit 35. The auxiliary plunger 50 is urged upwardly by the coil spring 54. The surge valve 37 serves the purpose of prefilling the main cylinder bore 24 during the forward stroke of the main plunger 17 as the latter coasts downwardly under the influence of gravity. The surge valve 37 closes automatically against the surge valve seat 55 when the platen 15 meets with resistance to its forward motion. The pressure built up within the upper part of the main cylinder bore 24 closes the surge valve 37 by urging its plunger 42 upwardly, aided by the force of the coil spring 44. The main plunger 17 thereafter ceases to draw in fluid from the surge tank 38, and the pressure is therefore built up by means of the pump 33 sufficient to complete the pressing stroke.

When the pump 33 is reversed, however, so that it supplies pressure fluid to the return line 30 (Figures 2 and 3), pressure fluid reaching the auxiliary cylinder bore 36 within the surge valve 37 forces the auxiliary plunger 50 downwardly, and forcibly holds open the surge valve plunger 42. During the return stroke of the main plunger 17, as brought about by pressure fluid entering the port 28 beneath the piston head 26, the fluid within the upper part of the main cylinder bore 24 above the piston head 26 is enabled to escape through the ports 45 and 46 directly into the surge tank 38. Mounted on top of the surge tank 38 is a boss 56, surrounding a port 57 in the surge tank cover 58, and serving to receive an air filter 59 (Figure 2) for excluding dirt and dust from the surge tank 38. The surge tank ordinarily contains a cooling coil (not shown) through which cold water may be circulated in order to carry off the heat which has developed in the working fluid, usually oil, by friction in the pump 33 and hydraulic circuit connected thereto.

Figure 9:
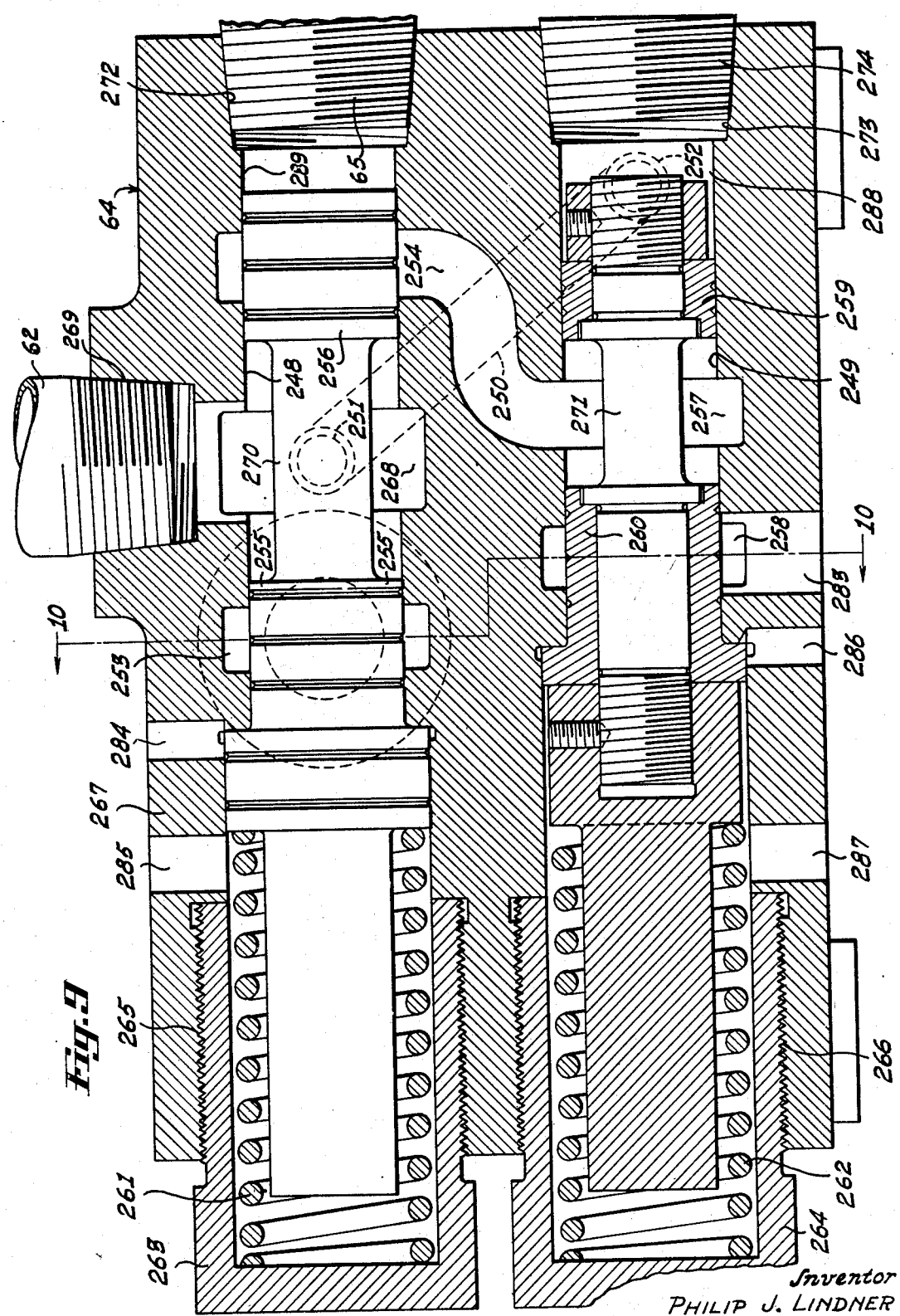
Figure 9 is a longitudinal section through the main cylinder relief and by-pass valve shown in the surge tank at the top of Figure 3.

Mounted upon the upper end of the conduit 34, immediately above its connection with the branch conduit 35, is a relief valve 60. A similar relief valve 61 is mounted on the end of the branch conduit 62 connected to the conduits 63, which communicates with the forward conduit 29. In Figure 3 the conduit 63, for simplicity and clearness, is shown as coming directly out of the forward pressure connection 31 of the variable delivery pump 33, instead of being concealed within the main cylinder 25 according to the showing in Figure 2. Connected to the branch conduit 62 is the main cylinder relief and by-pass valve 64 (Figure 3) having the conduit 65 connecting it to the conduit 34. The main cylinder relief and by-pass valve 64 is shown in detail in Figures 9 and 10. Its details, however, form no part of the present invention but are fully disclosed in the Ernst Patent No. 1,956,758, issued May 1, 1934. The valve 64 is an automatic valve serving the purpose of releasing the pressure from the main cylinder bore 24 above the piston head 26 at the instant of reversing the pump 33 to begin the retraction stroke so that the surge check valve plunger 42 may be forcibly opened by the auxiliary plunger 50. In the absence of such a device, pressure remaining in the upper part of the main cylinder bore 24 would prevent the opening of the surge valve 37.

An ordinary check valve 66 (Figure 3), having a ball 67 closing a port 68, is connected to the conduit 34 and serves to prevent the passage of fluid therethrough into the surge tank 38 during the return stroke of the press, while permitting the withdrawal of fluid therefrom during the forward stroke of the press. Connected to and communicating with the forward and return conduits 29 and 30 are the auxiliary conduits 69 and 70, respectively. These lead to the ejection and turret raising motors, as hereinafter disclosed. In order to limit the stroke of the main plunger 17 and platen 15, the strain rods 12 are provided with annular ridges and grooves 71 and 72, respectively engaged by the correspondingly ridged and grooved collars 73. This construction enables these collars to sustain a tremendous load and prevent overstroke in the event that the press should be operated without dies. The interlocking ridge and groove construction distributes the load and adds to the strength of the assembly.

Bolted to the under side of the main platen 15 is the die carrier support 74, having retaining members 75 bolted thereto and adapted to retain in the guideway 76 thereof the die carrier 77 (Figures 3 and 4). The die carrier 77 carries two clamping rings 78, each capable of holding a die. The die carrier 77 is reciprocated by means of the piston rod 79 (Figure 4), secured thereto as at 80 and having a double-acting piston head 81 reciprocable within the cylinder 82. The die carrier cylinder 82 is mounted upon the bracket 83 (Figures 1 and 4) depending from the platen 15. Pressure fluid, such as compressed air, is supplied to the opposite ends of the cylinder 82 through the conduits 84 and 85 leading to the die carrier control valve 86, to which compressed air is supplied through the branch conduit 87 from the compressed air supply conduit 88. The die carrier control valve 86 is actuated in one direction by the electrical solenoid 89, and in another direction by a spring therein (not shown). The conduits 84 and 85 are flexible so as to maintain communication while the platen 15 and the die carrier cylinder 82 are reciprocating, the die carrier control valve being bolted to the press head 10 (Figure 1). A manual air shut-off valve 90 enables the manual control over the supply of air to the die carrier control valve 86.

The conduit 88 is supplied with compressed air from any suitable compressed air source (not shown) by way of the conduit 91 (Figure 2). Leading from the conduit 91 on the opposite side of the conduit 88 (Figures 1 and 2) is a compressed air conduit 92 having at its opposite end a manually controlled shut-off valve 93, similar to the valve 90. Extending downwardly from the valve 93 is a conduit 94 leading to the manual air-control valve 95, having the valve rod 96 (Figures 2 and 7). Mounted on the valve rod 96 are the operating arms 97 and 98, to which are attached the operating cables 99 and 100, terminating in the buttons 101 and 102. The valve 95 controls the admission of air to the hoisting cylinder 103, containing a double-acting air-operated piston (not shown) upon a piston rod 104. Threaded into the lower end of the piston rod 104 is an adjusting rod 105, which in turn, is threaded into the yoke 106 having the pivot shaft 107 mounted in the bracket 108 thereof (Figure 7).

Pivotally mounted upon the pivot shaft 107 are the gripper arms 109, urged downwardly by the coil springs 110 surrounding the guide studs 111, which are threaded into the gripper arms 109. The studs 111 pass loosely through apertures 112 in the yoke 106, and on their upper ends carry the stop nuts 13 for limiting the motion of the gripper arms 109. The yoke 106 is mounted upon the slide 114 (Figure 4) by means of the neck 115. The slide 114 is reciprocable in the guideway 116 of the bracket 117 (Figures 4 and 7), mounted upon the head 10 of the press and depending from the extension 118 thereof (Figure 1). The slide 114 is held in the guideway 116 by means of the retaining plates 119, bolted to the bracket 117. In Figure 7 the gripper arms 109 are shown engaging a workpiece 120. This workpiece may obviously be of any character. For purposes of illustration the workpiece is illustrated as a cartridge case for an artillery shell, the press being well adapted for forming the flanged head upon the cartridge case. The successive stages of forming this cartridge case are shown in Figures 13 to 15, inclusive, and described hereinafter.

Also mounted upon the press head 10 and extending downwardly to the bed 11 is the control panel 121. This consists of a sheet metal shield for supporting the various control elements, switches and gauges utilized in the control of the press. Mounted upon the control panel 121 is the thermometer 122 and the hydraulic press gauge 123, also the push button stations 124 and 125 and the switch 126, these forming parts of the electrical control system hereinafter described. Also mounted upon the control panel 121 is the tonnage control device 127. The details of the latter form no part of the present invention. In effect, it consists of a pressure-responsive switch having an adjustment for varying the predetermined pressure at which the switch becomes operative. The tonnage control 127 contains a spring-loaded plunger working in a small hydraulic cylinder and operating an electric switch when the pressure of the fluid overcomes the compression of the spring. The spring compression may be adjusted by turning the hand wheel 128 and thereby the pressure at which the switch becomes operative is varied at the will of the operator. This tonnage control device 127 is connected in series with the upper chamber of the main cylinder bore 24 so as to be responsive to the pressure in the forward side of the hydraulic circuit.

Mounted upon the head 10 is a bracket 129, and disposed below it is a second bracket 130 for reciprocably guiding the press control rod 131 having thereon a collar 132 adapted to be engaged by the platen arm 133 (Figures 2 and 4), secured, as at 134, to one of the caps 20 (Figure 4) bolted to the platen 15. The control rod 131 also carries a collar 135, engaged by the yoke portion 136 of an arm 137 pivotally mounted at 138 upon the control panel 121, and having the hand lever 139 connected thereto. The hand lever 139 and the arm 137 have the action of a bellcrank lever for manually raising and lowering the control rod 131.

The platen arm 133 carries a switch-operating rod 140 (Figure 7), which in turn, carries a switch-operating cam 141 for operating certain limit switches, as hereinafter set forth in detail in connection with the electrical construction and operation. Mounted upon the control rod 131 is a switch-operating cam 142 for operating an additional limit switch, as hereinafter described, while above it is a collar 143 which engages the yoke portion 144 upon the end of a bellcrank lever 145, pivotally mounted as at 146 (Figure 2) upon the bracket 147, bolted to the press head 10. To the other arm of the bellcrank 145 is attached the rod 148, the opposite end of which is connected to one arm of the bellcrank 149, pivotally mounted as at 150 upon the pump-supporting bracket 151 secured to the press head 10. To the opposite end of the bellcrank 149 is connected the rod 152, terminating in the armature 153 of the solenoid 154.

Mounted upon the connecting rod 148 is a member 155 engaging the lower end of a rocker arm 156, pivotally mounted at 157 upon the pump bracket 151. To the upper end of the rocker arm 156 is attached the connecting rod 158, the opposite end of which is connected to the lever 159 pivotally mounted upon the floating link 160 attached to the pump servomotor 161. To the opposite end of the lever 159 is attached the servomotor control valve rod 162, which passes into the interior of the servomotor 161 and controls the delivery of the reversible variable delivery pump 33 (Figure 2). The reversible variable delivery pump 33 is of the radial piston type, well known to those skilled in the art, and containing a shiftring serving as a flow-control member for regulating the direction and amount of delivery of pressure fluid. This flow-control member (not shown) is connected on its opposite side to a safety centering device 163 (Figure 2) for moving the pump shift ring or flow-control member to its neutral or no delivery position, in the event of failure of power supply to the pump. This feature prevents the coasting down of the platen by its own weight in the event of such power interruption, and consequent accident or injury to the operator by its operating the pump 33 as a motor, and thereby accelerating the descent of the platen 15. The details of the servomotor 161 and the safety centering device 163 form no part of the present invention, and are disclosed in the copending application of Walter Ernst, Ser. No. 170,250, filed Oct. 21, 1937. The servomotor 161 contains a spring (not shown) which urges the valve rod 162 in one direction, whereas the energization of the solenoid 154 moves the valve rod 162 in the opposite direction by the links and levers described above.

The turret 14 (Figure 3) is made in two parts forming, in effect, turret halves which may be bolted together around the single strain rod 12 in order to facilitate assembly. The turret 14 consists of a hollow center post 164 carrying internal bushings 165 and 166, rotatably supporting it upon the strain rod 12. The turret 14 is provided with upper and lower portions 167 and 168, interconnected by the side portions 169 and containing the apertures 170 and 171, respectively, (Figure 3). The various portions of the turret are welded together in the previously described turret halves. Six turret stations 172 are mounted in the apertures 170 and 171, each of these being sufficiently strong to sustain the entire pressing force of the platen 15 in compression. The turret stations 172 support the plates 173 and rings 174, serving for the attachment of the lower dies. The tubular turret stations 172 are provided with bores 175, closed at their lower ends by the heads 176 (Figure 3), having bores 177 for receiving the ejector mechanism subsequently described. The turret 14 also carries an annular member 178 (Figures 3 and 6), to which is secured an internal ring gear 179, held in position by the retaining ring 180 bolted thereto and engaged by a driving pinion 181 on the shaft 182 of the turret-rotating motor 183, secured as at 184 to the press bed 11. When the motor shaft 182 is rotated, the pinion 181 thereon drivingly engages the ring gear 179 and rotates the turret 14. The motor 183 is a direct current motor arranged to provide dynamic braking characteristics, in the manner subsequently described in connection with the electrical system.

The turret center post 164 carries the upper retaining ring 185 (Figure 6) of the tapered roller bearings 186, the lower ring 187 of which is carried in a socket 188 within a yoke 189 (Figures 4 and 6). The latter extends diametrically across the space beneath the turret 14, and at its outer ends carries a pair of plungers 190. The plungers 190 are connected to the ends of the yoke 189, through a self-aligning connection consisting of a stud 191, threaded into the socket 192 in the end of the plunger 190, this in turn, being rounded as at 193 (Figure 6) and engaging the concavely rounded portion 194 of a disc 195 mounted in a socket 196 in the yoke 189. The stud 191 passes loosely through an enlarged bore 197, and at its upper end is threaded and carries a pair of retaining nuts 198.

The plunger 190 is reciprocable within the sleeve 199 of the turret-raising cylinder 200, the latter having a chamber 201 to which pressure fluid may be admitted at the connection 202 through the conduit 203. The cylinders 200 are supported upon brackets 204, mounted upon the press bed 11. The plunger 190 is surrounded by a packing 205, engaged by the ring 206, and in turn engaged by the sleeve 207 mounted in the gland 208, through which pass the studs 209, threaded into the cylinder 200 and carrying the adjusting nuts 210 upon their upper ends. The packing 205 is compressed by tightening the nuts 210. The details of the self-aligning connection 191 to 195 form no part of the present invention, and are disclosed and claimed in the copending application of Walter Ernst, Ser. No. 187,927 filed Jan. 31, 1938. In order to limit the motion of the yoke 189, stop rods 211 are threaded into the sockets 212 thereof and carry retaining nuts 213, threaded upon their lower ends (Figure 6).

The turret 14 is locked in the positions to which it is rotated and indexed by means of the locking mechanism shown in Figure 5. For this purpose the bottom plates 168 of the turret 114 are provided with hardened bushings 214, having bores 215 adapted to be engaged by the locking pin 216 working in the bore 217 of a casing 218, bolted to the press bed 11. Threaded into the lower end of the locking pin 216 is a rod 219, around which is arranged a coil spring 220 adapted to urge the locking pin 216 upward into the bore 215 of the hardened bushings 214. The lower end of the coil spring 220 is engaged by the end of a plug 221 threaded into the socket 222 at the lower end of the bore 217. The rod 219 passes outwardly through a hole 223 in the plug 221, and is adapted to engage a pair of limit switches, hereinafter described in connection with the electrical system and serving to synchronize the movements of the pin 216. The latter is provided with a passageway 224 having a pin 225 passing therethrough and engaged by the yoked end of a lever 226 pivotally mounted, as at 227, upon the casing 218, and having a link 228 connecting its opposite end with a lever 229, pivotally mounted as at 230 upon the press bed 11. Attached to the opposite end of the lever 229 is the connecting rod 231, having its lower end connected to the armature 232 of the locking pin solenoid 233. The solenoid 233 is bolted to the press bed 11, and when energized moves the locking pin 216 downwardly, compressing the spring 220 and withdrawing the locking pin 216 from the bushing 214, likewise actuating the limit switches, hereinafter described.

The workpiece loosening or ejecting mechanism consists of a hydraulic motor, generally designated 234 (Figures 3 and 8), having a cylinder or casing 235 bolted to the press bed 11, and containing a cylinder bore 236 having a double-acting piston 237 reciprocable therein. The piston rod 238 of this piston carries a wear plate 239, bolted to the upper end thereof. When the piston rod 238 is moved upwardly by admitting pressure fluid to the lower part of the cylinder bore 236, the wear plate 239 enters the hole 177 in the disc 176, which closes the bore 175 of the turret station 172 and lifts the plunger-like lower die portion 240. The latter extends upwardly into the interior of the workpiece and engages the internal end thereof, the outer surface of the workpiece being engaged by the annular lower die portion 241. The die portions 240 and 241 are separated from one another by an annular space (Figure 8) for receiving the workpiece, such as the cartridge case for an artillery shell.

When the lower die portion 240 is forced upwardly by the piston rod 238, its upper end engages the inner surface of the end of the workpiece, forcing the workpiece upwardly and loosening it from its position of rest between the die portions 241 and 240. The operator may then operate the air valve 95 to cause the gripper arms 109 to descend and grip the thus projecting workpiece 120, as shown in Figure 7. By reversing the valve 95 the hoisting piston rod 104 may be caused to ascend, thereby lifting the workpiece 120 entirely out of the space between the lower dies 240 and 241. The ejector piston rod 238 is provided with an annular shoulder 242 for the actuation of a limit switch, hereinafter described, for synchronizing the action of the ejector mechanism with the remaining mechanism of the press. The piston rod 238 is surrounded by a collar 243, surmounted by a packing 244 arranged to be compressed by the gland 245 bolted to the casing 235. The cylinder 235 is provided with two upper ports 246 and a lower port 247. To one of the upper ports 246 is connected the conduit 70, whereas to the lower port 247 is connected the conduit 69, these conduits being connected to the opposite sides of the variable delivery pump 33 (Figure 3). To the other upper port 246 is connected the line 203 leading to the turret-raising cylinders 200.

The main cylinder relief and by-pass valve 64, as stated above, is disclosed and claimed in the Ernst patent, No. 1,956,758, issued May 1, 1934. This valve provides for a drop in pressure within the upper part of the main cylinder 25 at the instant of reversal of the stroke of the main plunger 17, such a drop in pressure being necessary before the surge check valve plunger 42 can be moved downwardly. The valve 64 also takes care of the discharge of the pump 33 during the fraction of a second which is required for the forcible opening of the surge check valve 37 by its auxiliary plunger 50. The main cylinder relief and by-pass valve 64 (Figures 9 and 10) contains a pair of bores 248 and 249, interconnected by the passageway 250, joining the bore 248 at the port 251 and opening into the bore 249 at the port 252. The bore 248 contains annular enlargements or chambers 253 and 254 adapted to be closed by the valve piston heads 255 and 256. The annular chamber 254 is connected to an annular chamber 257 within the lower bore 249, the latter also having an annular chamber 258 to the left thereof. Valve piston heads 259 and 260 cooperate respectively with the annular chambers 257 and 258 during the operation of the valve 64.

The valve piston heads 255 and 256 are urged to the right by the coil spring 261, whereas the valve piston heads 260 and 259 are similarly urged to the right by the coil spring 262. These coil springs 261 and 262 engage the inner ends of caps 263 and 264, threaded into the threaded sockets 265 and 266 of the valve casing 267. The bore 248 is provided with an additional annular chamber 268, connected to the threaded port 269 to which the conduit 62 is attached. The chamber 268 surrounds the upper valve rod 270 in a similar manner that the lower annular chamber 257 surrounds the lower valve rod 271. The extreme left-hand end of the bore 248 is provided with a threaded port 272 to which the conduit 65 is connected (Figure 3). The corresponding threaded lower port 273 is closed by a threaded plug 274. Opening into the chamber 253 is a passageway 275, having a threaded port at the end thereof closed by a plug 277. Perpendicular to the passageway 275 is a threaded bore 278, terminating in an unthreaded conical portion 279 having a similar configuration to the conical portion 280 of a threaded choke plunger 281. The latter may be adjusted by applying a wrench to the head 282 so as to regulate the choke passageway between the portions 279 and 280. The annular chamber 258 is in communication, through the ports 283 (Figure 10), with the interior of the surge tank 38. Additional ports 284 and 285 for drainage purposes connect the bore 248 with the interior of the surge tank 38, as do similar ports 286 and 287 opening out of the bore 249.

In order to provide a drop in pressure within the main cylinder 25 so as to permit the surge check valve 37 to open after the reversal of the main plunger 17 at the end of its working stroke, and also to take care of the pump discharge at this instant, the main cylinder relief and by-pass valve 64 comes into action. While pressure is still standing within the upper part of the main cylinder bore 24, this pressure is also transmitted through the lines 63 and 62 (Figure 3) and the port 269, into the chamber 268 between the piston heads 255 and 256. This pressure also passes through the port 251, the passageway 250 and the port 252, into the chamber 288 at the end of the cylinder bore 249 adjacent the threaded plug 274, and acts against the piston head 259, pushing it together with the valve rod 271 and the piston 260 to the left, compressing the spring 262. The shifting of the piston head 260 to the left places the chamber 257 in communication with the chamber 258 and its ports 283. The area of the piston 259 and the stiffness of the spring 262 are so proportioned that only a very moderate pressure is required to compress the spring, for example, a pressure of about 80 pounds per square inch.

When the main plunger 17 is down at the end of its pressing stroke, the upper part of the main cylinder bore 24 contains a considerable volume of oil under a very high pressure at the instant that the pump is reversed, for example, 2500 pounds per square inch. Although the working fluid, such as oil, is only slightly compressible, there is nevertheless sufficient elasticity in the oil to maintain a considerable pressure within the upper portion of the main cylinder bore 24 for a fraction of a second after the pump 33 is reversed. At this time, however, the pump 33 having been reversed, is already discharging into the connection 32 (Figure 3) and the working fluid or oil cannot enter the lower portion of the main cylinder bore, beneath the main plunger piston head 26, because there is still pressure above the latter. For these reasons, therefore, pressure fluid passes from the connection 32, along the conduits 34 and 65, into the port 272 and end chamber 289 of the upper valve bore 248. The pressure of this fluid acts against the valve piston head 256, pushing it, the valve rod 270 and the valve piston head 255 to the left, compressing the coil spring 261. The latter is so proportioned that only a comparatively light pressure is required to do this.

The shifting of the piston heads 255 and 256 now enables oil to pass from the pump 33, through the conduits 34 and 65, into the upper end chamber 289, thence through the annular chambers 254 and 257, through the lower bore 249, into the annular chamber 258, and thence through the ports 283, into the interior of the surge tank 38. In this manner the discharge of the pump 33 is taken care of at the instant of reversal. As the valve piston head 255 is now pushed to the left, communication is established between the conduit 62 and the annular chamber 253 by way of the port 269, the annular chamber 268 and the upper valve bore 248. From the annular chamber 253 the working fluid or oil escapes (Figure 10) through the passageway 275 and the choke passageway between the plunger 281 and the conical bore 279, into the interior of the surge tank 38. In this manner the pressure is relieved within the upper portion of the main cylinder bore 24 above the main piston head 26 at the instant of reversal so as to permit the opening of the surge valve 37. The rate at which the pressure will drop within the upper portion of the main cylinder bore 24 is governed by the setting of the choke plunger 281 (Figure 10).

If pressure is released too suddenly by providing too large a choke opening between the portions 279 and 280, this too sudden release of pressure will cause an appreciable jump of the main plunger 17 and platen 15, due to the elasticity of the strain rods 12 and the other press members, as well as that of the working fluid or oil. The proper adjustment of the threaded choke plunger 281 prevents an undue jump of the main plunger 17 from these causes. When the pressure acting against the piston head 259 in the lower chamber 288 drops sufficiently to permit the coil spring 262 to move the valve piston heads 260 and 259 to the right, the by-pass action between the chambers 257 and 258 is terminated. In the meantime, however, the drop in pressure within the upper portion of the main cylinder bore 24 permits the surge check valve plunger 42, 43 to be pushed downwardly by the auxiliary plunger 50, thereby opening the surge valve 37 and permitting oil to pass directly from the chamber above the main piston head 26, into the surge tank 38. The main plunger 17 and platen 15 are now free to rise, and are forced upwardly as the pump 33 pumps oil into the lower portion of the main cylinder bore 24 beneath the main piston head 26.

The workpiece 120 may be of any suitable form. A typical workpiece, as shown in Figures 13, 14 and 15, consists of a cartridge case for an artillery shell, resembling a tube of brass, closed by a thick end wall 290. Prior to the first operation of the press the upper end of the workpiece 120 has the rough shape shown in Figure 13. After the first pressing operation with the first die, the inner and outer surfaces of the end wall 290 are flattened and a rounded portion 291 formed at the edge thereof (Figure 14). The second pressing operation converts this rounded edge 291 into stepped flanges 292 and 293, with a beveled portion 294 separating the flange 292 from the outer surface of the end wall 290. In this same pressing operation the inner surface of the end wall 290 is provided with a central projection 295. The tubular side walls 296 of the workpiece 120 remain relatively thin in comparison with the end wall 290 thereof. The operation of the press is obviously not confined to the production of these tubular cartridge cases, but the latter is merely shown as a convenient illustration for exhibiting the action of the press.

Electrical elements

The electrical circuit by which the press of this invention is controlled is shown in Figures 11 and 12. Figure 11 is an elementary wiring diagram showing more conveniently and more simply the various wires connecting the electrical elements with the power lines or sources of electricity, but separating the various contactor or relay switch blades from their operating coils. Figure 12 is the identical circuit shown in Figure 11, but the various switch blades of the contactors and relays are placed in their proper positions adjacent their respective operating coils so that the action of these contactors and relays is more conveniently understood.

The electrical circuit contains a number of contactor switches or relays, generally designated 301 to 310, respectively, the functions of these being described subsequently (Figure 12). The actions of these contactor switches or relays 301 to 310 are controlled by a plurality of limit switches, respectively designated 311 to 320, together with an oil temperature limit switch 321 and a tonnage-control switch 322. The latter is the electrical element within the tonnage control 127, and is in its effect a pressure-responsive switch. The electrical circuit of Figure 12 also contains a pump motor 323 for driving the variable delivery pump 33 and a motor 324 for driving the direct current generator 325, the latter supplying direct current for actuating the turret-rotating motor 183. The provision of this motor generator 324, 325 enables the use of the dynamic braking characteristics of the direct current motor 183 for slowing down and dynamically braking the turret 14 as it approaches its indexing positions. The motors 323 and 324, however, are actuated by alternating current under the control of the contactors 310 and 309, respectively distributing current thereto from the three-phase power lines 326, 327 and 328 (Figure 12). The action of the pump contactor 310 is controlled by a normally open pump start push button switch 329, and a normally closed pump stop switch 330 of the push button type. Each of the contactors 301 to 310 contains a plurality of switch blades, respectively designated a, b, c, etc. in conjunction with the numeral designating the contactor switch as a whole. In a few instances these contactor switch blades are normally closed upon their contacts, but ordinarily they are normally open and are closed by the energization of their operating coil, as set forth more in detail under the description of the operation.

The control circuit also contains a pair of resistors 331 and 332, in series with a pair of incandescent light bulbs 333 and 334 for indicating when the circuit is energized. Emergency stop switches of the push button type are provided at 335, these being normally closed and mounted upon various parts of the press so as to be conveniently accessible to the operator in an emergency. The press control circuit is also under the control of a stop-run switch 336, and is started by a plurality of cycle start switches 337. These switches 337 are of the push button type and are normally open. A pair of these push button switches is provided for each operator so that he must use both hands in operating the switches. This arrangement is a safety device for preventing the operation of the press when the operator's hands are in the working area of the press. Sometimes the press will be operated by a single operator and at other times by a pair of operators. In the latter event, two pairs of cycle start switches are provided so that each operator must have both hands on the switches before the press will start in operation. The foreman in charge of the machine can set the press for a single or a pair of operators by manipulating the operator switch 338, whereby a pair of switches 337 may be shunted out of the circuit, leaving but a single pair of switches to be actuated by a single operator. Additionally provided is a normally open push button type switch, designated the die reset switch 339, and a second normally open push button switch, designated the reset switch 340. The latter is associated with the emergency stop switches 335 adjacent the contactor 301 in Figure 12.

The locations of the various limit switches are as follows: Associated with the turret-locking mechanism (Figure 5) are the limit switches 311 and 312, these being actuated by the motion of the rod 219 in response to the upward and downward motion of the locking pin 216. Associated with the turret and operated by a cam 341 on the periphery thereof (Figure 4) is the limit switch 320. Adjacent the limit switch 320 is the limit switch 313, operated by the cam 342 (Figure 4), likewise on the periphery of the turret 14. The cam 341 actuates the limit switch 320 as the turret 14 approaches one of the indexing positions, in order to operate the dynamic braking circuit and slow down the turret 14, as hereinafter explained. The cam 342, however, operates the limit switch 313 when the turret 14 arrives at the indexing position to deenergize the solenoid 233 (Figure 5) and permit the turret-locking pin 216 to be urged upwardly by the coil spring 220 and enter the locking bushing 214, thereby locking the turret 14 in its indexed position.

Associated with the die-carrier 77 and operated thereby are the limit switches 314 and 315 (Figure 4). These limit switches control the circuit by insuring that the die-carrier 77 has reached the proper position as operated by the air cylinder 82 before the remainder of the press mechanism can operate. Associated with the platen-shifted control rod 131 (Figure 7) and operated thereby is the limit switch 316, this operating being brought about by the cam 142. Associated with the platen arm 133 and operated by the cam 141 upon the rod 140 thereof are the limit switches 317 and 318 (Figure 7). Associated with the ejector plunger 238 and operated by the annular shoulder 242 thereon (Figure 8) is the limit switch 319. The limit switch 320, as previously stated, is associated with the limit switch 313 and actuated by the rotation of the turret 14. The limit switch 321 is a temperature-responsive normally closed switch, which is exposed to the temperature of the oil and which operates automatically to open when the oil temperature exceeds a predetermined maximum. In this manner the overheating of the oil, which constitutes the working fluid, is prevented. The pressure switch 322 is located within the tonnage-control 127 and is normally closed, but is responsive to the attainment of a predetermined pressure in the pressing circuit to open. The pressure at which the pressure switch 322 becomes operative is adjusted, as previously stated, by the hand wheel 128, which compresses a spring to adjust the action of the hydraulic motor, which actuates the pressure switch 322. The various electrical units, such as the contactors, relays, etc. are arranged behind the control panel 121, which is made in box-like form to inclose them.

Associated with the field coils 343 and 344 is the resistor 345, and associated with the armature 346 is the resistor 347. The turret motor shunt field 348 is not subject to the action of these resistors. A voltmeter 349 and ammeter 350 indicate the condition of the circuit actuating the direct current turret-rotating motor 183. The various solenoids for operating the valve which controls the actions of the fluid pressure motors have already been described, and consist of the die-carrier valve-operating solenoid 89 (Figure 1), the servomotor control solenoid 154 (Figure 2) for actuating the servomotor control valve rod 162 of the servomotor 161 which actuates the shiftring or flow-control member of the variable delivery pump 33 and the locking pin solenoid 233 (Figures 1 and 5). An off-on switch 351 is arranged in series with the limit switch 316 with the action as hereinafter described.

Operation

Referring to Figure 12, the operator starts the pump 33 by momentarily depressing the pump start switch 329. This energizes the contactor switch 310 and closes its normally open blades 310a to 310d, inclusive, thereby energizing the pump motor 323 from the power lines 326, 327 and 328. A holding circuit, established through the upper switch blade 310a, bridges the circuit around the pump start switch 329 and maintains the contactor 310 in energization after the switch 329 has been released. The operator then closes the stop-run switch 336, which energizes the motor generator contactor 309 and closes its normally open blades to energize the motor generator motor 324. At the same time the indicating lamps 333 and 334 show that the circuit is energized. The motor generator 324, 325 then starts in operation to energize the direct current circuit shown at the bottom of Figure 12 for actuating the direct current turret-rotating motor 183.

The foreman, having determined whether one or two operators shall operate the press, sets the switch 338 either closed for a single operator or open for a pair of operators. Before the cycle start buttons 337, controlled by the switch 338, can become operative, however, it is necessary for the operator to energize the contactor 301 by momentarily closing the push button type reset switch 340. The latter closes a circuit through the normally closed emergency stop switches 335, and this action closes the three normally open switchblades 301a, 301b and 301c of the contactor 301. The closing of the switchblade 301a energizes a holding circuit to maintain the energization of the contactor 301 when the reset switch button 340 is released. The shifting of the switchblade 301b closes the circuit of the turret motor control relay 304, which has an alternating current relay handling the direct current through its single switchblade 304a. The closing of the normally open switchblade 304a energizes the contactors 307 and 308, controlling the direct current turret-rotating motor 183. The third switchblade 301c of the contactor 301 controls the circuit leading to the servomotor control solenoid 154 and to the portions of the circuit shown in Figure 12. If at any time one of the emergency stop switches 335 is depressed, the opening of the contact thereof deenergizes the contactor 301 and opens its contacts, deenergizing the previously-mentioned circuits. It is then necessary for the operator to depress the reset switch button 340 again in order to reenergize the contactor 301.

An operator now places an unfinished workpiece 120 (Figure 13) in the turret station 172 between the outer and inner lower die members 241 and 240. The workpiece is placed in the turret station that is ready to enter the press and be advanced to the pressing position. The operating cycle is then started by pressing either two or four of the cycle start buttons 337, depending upon whether one or two operators will operate the press, as determined by the setting of the switch 338. In either case, the provision of the switches insures that both hands of each operator are out of the working area of the press before starting the cycle of operations. The depressing of the cycle start buttons 337 closes a circuit through the normally closed limit switch 313, and likewise through the limit switch 319, the latter insuring that the ejector pin 238 is down (Figure 8). The circuit is thereby energized through the operating coil of the contactor 302 which controls the locking pin solenoid 233. The normally open switchblades thereof close and the upper switchblade 302a operates a holding circuit around the cycle start buttons 337 so as to maintain the energization of the contactor 302 when the operator or operators have released the cycle start buttons 337. The closing of the contactor 302 energizes the locking pin solenoid 233 through the now closed switchblades 302c and 302d, causing the locking pin 216 to be withdrawn from its locking position and compressing the coil spring 220 (Figure 5). The closing of the switchblade 302b energizes the operating coil of the die contactor 303 through the normally closed limit switch 317. The latter is opened when the main plunger 17 and platen 15 reach their downward position, thereby providing a safeguard against the operation of the die-carrier 77 when the platen 15 is down. The upper switchblade 303ª, when closed, establishes a holding circuit to maintain the energization of the contactor 303 after the contactor 302 has been deenergized. The normally open switchblade 306ᵈ is placed in parallel with the limit switch 317, and operates in the manner described below.

The withdrawal of the locking pin 216 closes the contacts of the normally open limit switch 311 (Figure 5), thereby closing the circuit through the normally closed switchblade 306ᶜ (which is closed when the platen 15 is up); the now closed switchblade 301ᵇ; the now closed limit switch 319 (which has been permitted to shift to its normally closed position by the withdrawal of the ejector plunger 238) and the operating coil of the turret motor control relay 304. The energization of the relay 304 closes its normally open switchblade 304ª and energizes the contactors 307 and 308 with direct current from the direct current generator 325. The closing of the contactors 307 and 308 energizes the turret-rotating motor 183 and starts it in operation. The normally closed limit switch 320 is now in a closed position at this point of the cycle because it is not yet opened by the cam 341. The closing of the switchblades 307ª and 308ª, in series with the armature and fields of the turret motor 183, brings the motor 183 into operation at full speed at its full voltage. The switchblades 307ᵇ and 307ᶜ, however, are normally closed, hence, will be open at this point in the cycle.

The operation of the turret motor 183 rotates the turret until it approaches its indexing position, whereupon the cam 341 (Figure 4) opens the limit switch 320 and holds it open temporarily. This action deenergizes the operating coil of the contactor 307 and thereby opens its normally open switchblade 307ª while closing its normally closed switchblades 307ᵇ and 307ᶜ. This action places the resistor 345 in parallel with the motor armature 346 and commutating field 343, and also the resistor 347 in series with this combination. The resistance thus introduced into the turret motor circuit causes the speed of the turret motor 183 to be greatly reduced, for example, to about twenty-five per cent. of its normal speed, thereby slowing down the turret 14 as it approaches its next position. Just prior to reaching the next position the turret 14, by its cam 342, causes the limit switch 313 to be momentarily opened, thereby deenergizing the contactor 302 and the locking pin solenoid 233, thus permitting the spring 220 thereof (Figure 5) to push the locking pin 216 upwardly until it rests against the turret bottom portion 168. This slight motion of the locking pin 216 is sufficient to permit the normally open limit switch 311 to open, thereby deenergizing the operating coil of the contactor 304.

The consequent opening of the switchblade 304ª breaks the circuit through the operating coils of the contactors 307 and 308. This action leaves the resistor 345 connected across the armature circuit of the turret motor 183, thereby causing the latter to dynamically brake the turret 14. The latter, however, has sufficient momentum to carry it around until the locking pin 216 arrives opposite the bushing 214 (Figure 5), and is pushed into the aperture 215 by the spring 220. This locks the turret 14 in its working position. The motion of the locking pin 216 into the bushing 214 permits the normally closed contacts of the limit switch 312 to close, thereby placing the circuit in readiness for the downward or power stroke of the main plunger 17 and platen 15. The closing of the contacts of the limit switch 312 energizes the operating coil of the contactor 305 by way of the now closed switchblades 301ᶜ and 303ᵇ. The switchblade 305ª is connected in parallel with the contacts of the switchblade 303ᵇ and the normally closed contacts of the limit switch 318 so as to form a holding circuit for the operating coil of the contactor 305, even if the operating coil of the contactor 303 is later deenergized. The contacts of the switchblade 306ᵉ are also in parallel with the limit switch 318, the latter being normally closed but opened by the platen arm cam 141 (Figure 7).

The closing of the contacts of the limit switch 312 also completes the circuit to the off-on selector switch 351. With the latter switch in its off position it is possible to operate the turret 14 without operating the main plunger 17, so as to set up the machine or make necessary adjustments in the operation of the turret. With the closing of the selector switch 351, however, the circuit will be completed to the operating coil of the ram control contactor 306 through the contacts of the normally open limit switch 316, which is now held closed by the control rod cam 137 (Figure 7) because the main plunger 17 is in its up position. The circuit, which is thus closed, continues from the limit switch 316, through the now closed contacts of the normally open switch 314, this being held closed by its engagement with the die-carrier 77 when the latter has moved into its proper position, this indicating that the first upper die is aligned with the lower die. The thus closed circuit continues through the now closed contacts of the switchblades 303ᵈ and 305ᵇ and the normally closed oil temperature limit switch 321. The energization of the operating coil of the contactor 306 closes the contacts of the switchblades 306ᵉ and 306ᶠ, thereby completing the circuit through the servomotor control solenoid 154.

The energization of the servomotor control solenoid 154 shifts the servomotor control valve rod 52, causing the pump servomotor to move its shift-ring or flow-control member into its forward delivery position. The pump 33 then pumps oil from the surge tank 38, through the check valve 67 and conduit 34, and also from the main cylinder bore beneath the main piston head 26, through the conduit 30, into the conduit 29 leading to the main cylinder 25 above the piston head 26. This causes the main plunger 17 and platen 15 to descend. These will move downwardly by gravity as fast as oil is removed from beneath the piston head 26, and the void above the piston head 26 will be filled by oil passing from the surge tank through the surge valve 37, which has meanwhile opened. The switchblade 306ᵇ is placed in series with the contacts of the pressure switch 322, and this maintains a circuit to the operating coil of the contactor 306 after the contacts of the limit switch 316 have opened. The limit switches 317 and 318 are so located that when the platen 15 moves downwardly these normally closed switches are opened momentarily by the cam 141 carried on the rod 140 extending upwardly from the platen arm 133. This has no effect upon the circuit because they are in parallel with the contacts of the now closed switch blades 306ᵈ and 306ᵃ, respectively.

As the platen 15 moves downwardly and engages the workpiece, pressure consequently is built up in the upper part of the main cylinder bore 24. This pressure causes the surge valve 37 to close, whereupon pressure fluid from the pump 33 continues to force the main plunger 17 downwardly until the pressure in the circuit exceeds the predetermined pressure at which the pressure switch 322 opens. The latter then opens and deenergizes the operating coil of the contactor 306, whereby opening the contacts of the switch blades 306ᵉ and 306ᶠ and deenergizing the servomotor control solenoid 154. With the pull of the solenoid removed, a spring within the pump servomotor 161 shifts the valve rod 162 thereof and reverses the setting of the pump flow-control member, thereby reversing the pump. The latter then is in position to pump the oil from the space above the main piston head 26 and into the space below the main piston head 26. The latter space, however, is much smaller than the space above the piston head 26, but this surplus oil is taken care of by the forcible opening of the surge valve 37 by the auxiliary plunger 50 by means of pressure fluid received through the conduit 34 from the return side of the pump circuit. The opening of the surge valve 37, of course, takes place after the main cylinder relief and by-pass valve 64 is operated to reduce the pressure in the main cylinder bore 24 above the main piston head 26, and temporarily to by-pass the discharge of the pump 33 in the manner described above in connection with the construction of the valve 64. When the pressure has been sufficiently reduced by the action of the valve 64 the check valve 37 opens and permits oil to flow freely from the main cylinder 25, directly into the surge tank 38.

As the platen 15 moves upwardly the normally closed limit switches 317 and 318 are again opened momentarily as the up stroke of the ram proceeds. The opening of the limit switch 318 has no effect since it is still in parallel with the contactor switchblade 303ᵇ. As the contactor 306 is now deenergized, the contacts of its switchblades 306ᵈ and 306ᵃ are now open. The opening of the limit switch 317, however, deenergizes the operating coil of the contactor 303 and consequently opens the contacts of its switchblades 303ᵉ and 303ᶠ to deenergize the die-carrier valve solenoid 89. The operating coil of the contactor 305, however, remains energized through the holding circuit established by way of the normally open but now closed switchblade 305ᵃ and the limit switch 318, thereby bridging the circuit around the switchblade 303ᵇ. Spring action within the air valve 86 (Figure 1) causes the valve 86 to shift so that compressed air is applied to the reverse side of the piston in the air cylinder 82, causing the second upper die to be shifted to the position formerly occupied by the first upper die through the reciprocation of the die-carrier 77.

The shifting of the die-carrier 77 releases the normally open limit switch 314 and permits it to open, at the same time closing the normally open limit switch 315. As soon as the main plunger 17 and platen 15 reach their top positions, so as to close the limit switch 316 by means of the control rod cam 142, a circuit is established through the now closed switch blade 301ᶜ, the now closed limit switch 312, which has been permitted to close by the advancement of the turret-locking pin 216 into the locking bushing 214, the off-on selector switch 351, which is assumed to have been closed by the operator, the normally open limit switch 316 (now held closed by the control rod cam 142), the limit switch 315 (normally open but now held closed by the die-carrier 77), the closed contacts of the switch blades 303ᶜ and 305ᵇ, the operating coil of the contactor 306 and the oil temperature limit switch 321.

When the contactor 306 is thus energized it closes the contacts of its switch blades 306ᵉ and 306ᶠ, thereby energizing the servomotor control solenoid 154 and shifting the control of the pump 33 so as to deliver pressure to cause the main plunger 17 again to start a down stroke for the second operation upon the workpiece. After the first operation the workpiece, it will be recalled, has the appearance shown in Figure 14. The second operation now gives it the appearance of Figure 15, as previously described. At this time, however, because the operating coils of the contactors 302 and 303 are deenergized, the contacts of their switch blades 302ᵇ and 303ᵃ are open so that no circuit can be completed through the limit switch 317 or the switch blade 306ᵈ to the operating coil of the contactor 303. The latter, therefore, remains deenergized and its switchblade 303ᵇ is open, but the operating coil of the contactor 305 is held in its previously energized condition by reason of the holding circuit established through its upper switchblade 305ᵃ and the limit switch 318. Therefore, even though the normally closed limit switch 318 is opened by the cam 141 upon the descent of the platen 15 and platen arm 133, it will have no effect upon the remainder of the circuit because it is in parallel with the then closed contacts of the switchblade 306ᵃ. The opening of the limit switch 317 by the same action also has no effect because the circuit through this limit switch has already been opened.

The main plunger 17 and platen 15 move downwardly until the second upper die engages the workpiece and performs a pressing stroke, whereupon pressure is again built up to the setting of the pressure switch 322, thereby opening the latter. The opening of the pressure switch 322 deenergizes the operating coil of the contactor 306, and as a consequence deenergizes the servomotor control solenoid 154, causing the delivery of the pump 33 to be reversed, whereupon the main plunger 17 is retracted, as previously explained, and returns to its upper position. Since the contacts of the switchblades 303ᵇ and 306ᵃ are now open, however, the opening of the limit switch 318 on the up stroke of the main plunger 17 now causes the operating coil of the contactor 305 to be deenergized. This opens the contacts of the switchblade 305ᵇ so that when the main plunger 17 has returned to its top position and the control rod cam 142 has closed the normally open limit switch 316, no circuit is completed and the servomotor control solenoid 154 will not be energized. Accordingly, the main plunger 17 and platen 15 remain stationary in their retracted position. The next cycle of operation of the press is started by pressing the cycle start buttons 337, in the manner previously described, after which the platen 15 will again automatically perform a pair of pressing strokes with the first and second upper dies as previously described, and will then come to a halt at the upper end of its retraction stroke.

During each time that the platen 15 goes up the turret-lifting plungers 190 are also raised, because pressure fluid is supplied thereto each time through the conduit 70 leading from the pull-back conduit 30 to the turret-raising cylinders 200. At the same time the ejector plunger 238 is forced downwardly because pressure is admitted above its piston head 237. Furthermore, each time the main plunger 17 and platen 15 descend, the ejector plunger 238 rises because the cavity beneath it is connected to the forward delivery side of the pump through the conduit 69. While this connection causes the turret-lifting plungers 190 and the ejector plunger 238 to make a useless stroke in each operating cycle, because nothing is gained by their functioning twice during the indexing movements of the turret 14, no harm is done by these movements and the circuit is kept in a simple condition. The additional movement of these plungers could be prevented by suitable alterations to the hydraulic and electrical circuits, but such a modified arrangement would complicate these circuits.

When the starter switches 137 are closed in the manner described above, to cause the platen 15 to start a forward stroke, the turret 14 is, as previously mentioned, moved to a new indexing position, while the pump 33 is moved to forward stroke position and the pressure fluid supplied thereby passes through the conduit 69 to the ejection cylinder 235 where it operates the ejector plunger 238 to urge the lower die portion 240 upwardly, so as to loosen the workpiece from the dies and turret station 172 (Figure 8). The operator then shifts the air valve 95 so as to cause the gripper arms 109 to descend and grip the flange at the top of the workpiece (Figure 7). A second shifting of the air valve 95 causes the gripper arms 109 to rise, hoisting the workpiece 120 out of the machine and permitting it to be removed by the operator. Another workpiece may then be inserted in the position previously occupied by the workpiece which has just been removed. This removal operation, of course, takes place only after the main plunger 17 has performed a working stroke, with each of the two dies upon the upper die-carrier 77.

It will be understood that I desire to comprehend within my invention such modifications as come within the scope of the claims and the invention.

Having thus fully described my invention, what I claim as new and desire to secure by Letters Patent, is:

1. In combination in a press, a frame, a workholding turret rotatably mounted in said frame, a movable pressing plunger, a horizontally reciprocable die carrier carrying a plurality of dies and being operable in response to a predetermined point of travel of said plunger, and means for rotating said turret into successive working positions before said plunger, said die carrier being operable independently of said turret.

2. In combination in a press, a frame, a workholding turret rotatably mounted in said frame, a horizontally reciprocable pressing plunger, a movable die carrier for carrying a plurality of dies, said die carrier being vertically reciprocable by said plunger, means for rotating said turret into successive working positions before said plunger, means for maintaining said turret in a stationary position during a plurality of strokes of said plunger, and means operable in response to a predetermined position of said plunger for causing movement of said die carrier from one position into another position after each plunger stroke during said stationary position of said turret.

3. In combination in a press, a frame, a workholding turret rotatably mounted in said frame, a horizontally reciprocable pressing plunger, a movable die carrier engageable by said plunger for carrying a plurality of dies, means for rotating said turret into successive working positions before said plunger, said die carrier being reciprocably mounted on said plunger and movable therewith, a fluid pressure motor for reciprocating said die carrier to present the dies successively before the working position of said plunger, a fluid source to supply fluid pressure to said motor for actuating the same, valve means controlling the direction of flow of fluid from said fluid source to said fluid pressure motor to vary the direction of movement of said die carrier, and means operable by said plunger for controlling said valve means.

4. In combination in a press, a frame, a workholding turret rotatably mounted in said frame, a movable pressing plunger, anti-friction bearings for rotatably supporting said turret, means for normally supporting said turret in engagement with said frame, hydraulic motor means operatively connected with said turret for selectively bringing said bearings into and out of engagement with said turret whereby to selectively support said turret on said bearings for indexing operations or on said frame for pressing operations, and pressure responsive means operable in response to a predetermined pressure on said plunger to cause the admission of pressure fluid to said hydraulic motor for lifting said turrent off said frame.

5. In combination in a press, a frame, a workholding turret rotatably mounted in said frame, a movable pressing plunger, advancing means for advancing said plunger, fluid operable retracting means for retracting said plunger, anti-friction bearings for rotatably supporting said turret, means for selectively supporting said turret in engagement with said frame, a movable bearing support carrying said bearings, and a fluid operable motor controlled by the operation of said retracting means for selectively moving said bearing support and said bearings into and out of supporting engagement with said turret whereby to selectively support said turret on said bearings for indexing operations or on said frame for pressing operations.

6. In combination in a press, a frame, a workholding turret rotatably mounted in said frame, a movable pressing plunger, anti-friction bearings for rotatably supporting said turret, means for selectively supporting said turret in engagement with said frame, a movable bearing support carrying said bearings, a motor for selectively moving said bearing support and said bearings into and out of supporting engagement with said turret whereby to selectively support said turret on said bearings for indexing operations or on said frame for pressing operations, a motor for rotating said turret into successive indexing positions relatively to said plunger, and means for synchronizing the operation of said turret-rotating motor with the operation of said bearing support-moving-motor.

7. In combination in a press, a frame, a rotatable work-holding turret comprising a plurality of turret stations, a movable pressing plunger, electric motor means for successively moving each of said turret stations into alignment with said plunger, controlling means responsive to the initiation of a working cycle of said plunger for energizing said electric motor means to effect rotative movement of said turret from one turret station to the next turret station, said working cycle comprising a plurality of working strokes of said pressing plunger, means responsive to a predetermined point of movement of said turret for effecting deenergization of said electric motor means, locking means responsive to said last mentioned means for locking said turret with a turret station in alignment with said pressing plunger, means controlled by said locking means for preventing energization of said electric motor means until a new working cycle is initiated, an ejector disposed for ejecting a completed work piece from a turret station when the latter has moved from a position in alignment with said pressing plunger to its next halting position, and means responsive to the initiation of a working cycle of said pressing plunger for actuating said ejector.

8. In combination in a press, a frame, a work-holding turret rotatably mounted in said frame and comprising a plurality of turret stations, a single movable pressing plunger, electric motor means operable in response to the initiation of a first working stroke of said plunger for moving one of said turret stations out of and another of said turret stations into alignment with said pressing plunger, a horizontally reciprocable die carrier supported by said plunger and carrying two dies adapted sequentially to be brought into alignment with one and the same turret station during two subsequent pressing operations of said plunger, locking means operable to prevent rotation of said turret during said two subsequent pressing operations, and ejector means responsive to the initiation of a working stroke following said two subsequent pressing operations for ejecting a shaped work piece.

9. In combination in a press, a frame, a work-holding turret rotatably mounted in said frame and comprising a plurality of turret stations, a single movable pressing plunger, electric motor means operable in response to the initiation of a first working stroke of said plunger for moving one of said turret stations out of and another of said turret stations into alignment with said pressing plunger, a horizontally reciprocable die carrier supported by said plunger and carrying two dies adapted sequentially to be brought into alignment with one and the same turret station during two subsequent pressing operations of said plunger, means controlled by said pressing plunger for causing said carrier to change the position of the dies carried thereby, ejector means arranged laterally of the axis of said pressing plunger and operable in response to the initiation of a working cycle of said pressing plunger to partially lift a previously finished work piece out of said turret, and a work piece extracting device arranged in alignment with said ejector means for extracting the work piece from said work-holding turret.

10. In combination in a press, a frame, a work-holding turret rotatably mounted in said frame, a movable pressing plunger, a plurality of horizontally reciprocable dies adapted to be reciprocated vertically by said pressing plunger, means synchronized with the motion of said pressing plunger for positioning said dies selectively before said pressing plunger, means synchronized with the motion of said plunger for rotatably indexing said turret into working positions in alignment with said plunger, an ejector disposed in alignment with a holding position of said turret, said ejector including an ejector plunger and a fluid pressure motor for reciprocating said ejector plunger into and out of said work-holding turret, and means synchronized with the motion of said pressing plunger for operating said fluid pressure motor to cause said ejector to eject the workpiece.

11. In combination in a press, a frame, a work-holding turret rotatably mounted in said frame and including a plurality of work-holding stations, a movable pressing plunger, electrically operable locking means for locking a work-holding station in alignment with said pressing plunger, a motor responsive to the unlocking of said locking means for rotating said turret, and means for braking the motion of said turret as a work-holding station approaches alignment with said pressing plunger.

12. In combination in a press, a frame, a work-holding turret rotatably mounted in said frame and including a plurality of work-holding stations, a movable pressing plunger, electrically operable locking means for locking a work-holding station in alignment with said pressing plunger, a motor adapted in response to the unlocking of said turret to cause rotation of said turret, means for automatically slowing down said motor at a predetermined position as a work-holding station approaches alignment with said pressing plunger, means for subsequently braking the motion of said turret at a predetermined position following said slow-down position, and means causing said locking means again to lock said turret when said turret has rotated by a predetermined amount.

13. In combination in a turret press, a frame, a work-holding turret rotatably mounted in said frame and including a plurality of work-holding stations, a movable pressing plunger, a direct current motor for rotating said turret, and means operable by said turret during the rotation thereof for automatically interposing resistance in the energization circuit of said motor to slow down the rotative movement of said turret.

14. In a combination in a turret press, a frame, a work-holding turret rotatably mounted in said frame and including a plurality of work-holding stations, a movable pressing plunger, a direct current motor for rotating said turret, cam means operatively connected with said turret and adapted automatically to cause an increase in resistance in the energization circuit of said motor in response to the rotation of said turret to a predetermined position, and means for subsequently cutting out a portion of said resistance while retaining a portion thereof across the armature circuit of said motor whereby to provide dynamic braking for said motor and turret.

15. In combination in a turret press, a frame, a work-holding turret rotatably mounted in said frame and including a plurality of work-holding stations, a movable pressing plunger, a direct current motor for rotating said turret, means operable by said turret for automatically interposing resistance in the energization circuit of said motor when the turret has reached a predetermined position, and means responsive to the rotation of said turret to a second predetermined position for subsequently cutting out a portion of said resistance while retaining a portion thereof across the armature circuit of said motor whereby to provide dynamic braking for said motor and turret.

16. In a combination in a turret press, a frame, a work-holding turret rotatably mounted in said frame and including a plurality of work-holding stations, a movable pressing plunger, a motor for operating said pressing plunger, a motor for rotating said turret, a locking member, and means responsive to the rotation of said turret to a predetermined position for deenergizing said turret-rotating motor and rendering operative said pressing-plunger-operating motor.

17. In combination in a turret press, a frame, a work-holding turret rotatably mounted in said frame and including a plurality of work-holding stations, a movable pressing plunger, a motor for operating said pressing plunger, a motor for rotating said turret, a locking member, means responsive to the rotation of said turret to a predetermined position for deenergizing said turret-rotating motor and rendering operative said press-plunger-operating motor, and an electro-magnetic device operatively responsive to the approach of one of said work-holding stations toward alignment with said pressing plunger for effecting the moving of said locking member into engagement with said turret.

18. In combination in a turret press, a frame, a work-holding turret rotatably mounted in said frame, a movable pressing plunger, a hydraulic motor for operating said pressing plunger, a hydraulic pump for operating said hydraulic motor, an electric motor for rotating said turret, and means responsive to the rotation of said turret to a predetermined position for deenergizing said turret-rotating motor and for placing said pump in operation for delivering pressure fluid to said hydraulic motor to advance said pressing plunger.

19. In combination in a turret press, a frame, a work-holding turret rotatably mounted in said frame, a movable pressing plunger, a hydraulic motor for operating said pressing plunger, a variable delivery hydraulic pump for operating said hydraulic motor, said hydraulic pump including a flow-control member for varying the flow of fluid therefrom and an electro-magnetic device for controlling the shifting of said flow-control member, an electric motor for rotating said turret, and means responsive to the rotation of said turret to a predetermined position for deenergizing said turret-rotating motor and for altering the energization condition of said electro-magnetic device to shift said flow-control member for causing said pump to deliver fluid to advance said pressing plunger.

20. In combination in a turret press, a frame, a work-holding turret rotatably mounted in said frame and including a plurality of work-holding stations, a movable pressing plunger, a motor for operating said pressing plunger, a motor for rotating said turret, a locking member, means responsive to the rotation of said turret to a predetermined position for deenergizing said turret-rotating motor and rendering operative said pressing-plunger-operating motor, and means for preventing the energization of said pressing-plunger-operating motor until a work-holding station of said turret reaches a position in working alignment with said pressing plunger.

21. In combination in a turret press, a frame, a work-holding turret rotatably mounted in said frame and including a plurality of work-holding stations, a movable pressing plunger, a motor for operating said pressing plunger, a motor for rotating said turret, a locking member, means responsive to the rotation of said turret to a predetermined position for deenergizing said turret-rotating motor and rendering operative said pressing-plunger-operating motor, a locking member for locking said turret, means for moving said locking member into and out of locking engagement with said turret, and limit switch means engageable by said locking member for preventing the energization of said turret-rotating motor until the withdrawal of said locking member therefrom.

22. In combination in a press, a frame, a work-holding turret rotatably mounted in said frame, a movable pressing plunger, a movable die carrier engageable by said plunger for carrying a plurality of dies, means for rotating said turret into successive working position before said plunger, means for selectively moving said die carrier into a plurality of positions for selectively positioning said dies before said plunger, a motor for moving said pressing plunger, and limit switch means engageable by said die carrier for preventing the actuation of said pressing-plunger-moving motor until said die carrier reaches a predetermined position.

23. In combination in a press, a frame, a work-holding turret rotatably mounted in said frame, a movable pressing plunger, a movable die carrier engageable by said plunger for carrying a plurality of dies, means for rotating said turret into successive working positions before said plunger, means for selectively moving said die carrier into a plurality of positions for selectively positioning said dies before said plunger, a hydraulic motor for moving said pressing plunger, a variable delivery hydraulic pump for supplying pressure fluid to said hydraulic motor and including a flow-control member, means including an electro-magnetic device for regulating the shifting of said flow-control member, and limit switch means engageable by said die carrier for preventing the energization of said electro-magnetic device until said die carrier reaches a predetermined position.

24. In combination in a press, a frame, a work-holding turret rotatably mounted in said frame, a movable pressing plunger, a movable die carrier engageable by said plunger for carrying a plurality of dies, means for rotating said turret into successive working positions before said plunger, means for selectively moving said die carrier into a plurality of positions for selectively positioning said dies before said plunger, a hydraulic motor for moving said pressing plunger, a variable delivery hydraulic pump for supplying pressure fluid to said hydraulic motor and including a flow-control member, means including an electro-magnetic device for regulating the shifting of said flow-control member, limit switch means engageable by said die carrier for preventing the energization of said electro-magnetic device until said die carrier reaches a predetermined position, said turret having a plurality of work-holding stations, and additional limit switch means for preventing the energization of said electro-magnetic device until a work-holding station of said turret reaches alignment with a die of said die carrier on said pressing plunger.

25. In a press, a pressing plunger, a movable die receiving member for supporting a die with a work piece therein, means for moving said die receiving member into alignment with said pressing plunger for a pressing operation, movable bearing means for supporting said die receiving member during the movement thereof, stationary supporting means for said die receiving member to support the latter during a pressing operation independently of said moving means, means responsive to the initiation of a working stroke of said plunger for actuating said moving means, means responsive to a predetermined point of travel of said moving means for locking the same in a position in alignment with said plunger, means for actuating said plunger to apply pressure to a work piece in said die, and fluid means operable responsive to the initiation of a new working cycle of said plunger for lifting the material previously pressed out of said die receiving member.

26. In a press, a press ram having associated therewith hydraulically operable advancing and retracting means for respectively advancing and retracting said ram, a plurality of horizontally reciprocable upper dies adapted subsequently to be brought into alignment with said ram and to be vertically reciprocated thereby, movable supporting means for rotatably supporting a plurality of lower dies for cooperation with said upper dies, bearing means for supporting said movable supporting means, stationary supporting means adapted directly to support said movable supporting means independently of said bearing means, and means hydraulically connected with said ram advancing means and responsive to an advancing movement of said ram for making said bearing means ineffective and directly supporting said movable supporting means by said stationary supporting means.

27. In a press, a press ram having associated therewith hydraulically operable advancing and retracting means for respectively advancing and retracting said ram, movable supporting means for rotatably supporting a plurality of dies, bearing means for rotatably supporting said movable supporting means, stationary supporting means for supporting each die, when in alignment with said ram, independently of said bearing means, means for advancing said ram to press a work piece into a die when so independently supported of said bearing means, means hydraulically connected with said ram retracting means and responsive to operation of the latter for supporting said movable supporting means by said bearing means, and means responsive to operation of said ram advancing means for making said bearing means ineffective and supporting said movable supporting means by said stationary supporting means.

PHILIP J. LINDNER.